United States Patent
Kounavis et al.

(10) Patent No.: US 7,457,296 B2
(45) Date of Patent: Nov. 25, 2008

(54) METHOD AND APPARATUS FOR SORTING PACKETS IN PACKET SCHEDULERS USING A CONNECTED TRIE DATA STRUCTURE

(75) Inventors: Michael Kounavis, Hillsboro, OR (US);
Alok Kumar, Santa Clara, CA (US);
Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 10/956,326

(22) Filed: Sep. 30, 2004

(65) Prior Publication Data
US 2006/0067325 A1 Mar. 30, 2006

(51) Int. Cl.
*H04L 12/28* (2006.01)
(52) U.S. Cl. .................................. 370/395.4; 370/400
(58) Field of Classification Search ........................ None
See application file for complete search history.

(56) References Cited

U.S. PATENT DOCUMENTS

| | | | |
|---|---|---|---|
| 7,110,411 B2 * | 9/2006 | Saidi et al. | 370/395.4 |
| 7,212,531 B1 * | 5/2007 | Kopelman et al. | 370/392 |
| 2002/0136230 A1 * | 9/2002 | Dell et al. | 370/416 |
| 2003/0081554 A1 * | 5/2003 | Huang et al. | 370/238 |
| 2004/0100950 A1 * | 5/2004 | Basu et al. | 370/389 |
| 2004/0111402 A1 * | 6/2004 | Waters et al. | 707/3 |
| 2005/0114298 A1 * | 5/2005 | Fan et al. | 707/2 |

OTHER PUBLICATIONS

C.R. Bennett and H. Zhang, "WF2Q: Worst-case Fair Weighted Fair Queueing", Infocom'96, Mar. 1996.
J.C.R. Bennett and H. Zhang, "Why WFQ Is Not Good Enough for Integrated Services Networks", Proceedings of NOSSDAV'96, Apr. 1996.
A. Demers, S. Keshav and S. Shenker, "Analysis and Simulation of a Fair Queueing Algorithm", Proc. ACM SIGCOMM '89, pp. 1-12; also in Journal of Internetworking Research and Experience, V1, N1, Sep. 1990, pp. 3-26.
P. Goyal, H.M. Vin, and H. Cheng, "Start-time Fair Queuing: A Scheduling Algorithm for Integrated Services Packet Switching Networks", IEEE/ACM Transactions on Networking, vol. 5, No. 5, pp. 690-704, Oct. 1997.
A. K. Parekh and R. Gallager, "A Generalized Processor Sharing Approach to Flow Control in Integrated Services Networks"—The Single Node Case, IEEE/ACM Transactions on Networking, vol. 1, No. 3, pp. 344-357, Jun. 1993.
H. Zhang and E. Knightly, "Comparison of Rate-Controlled Static Priority and Stop-and-Go", ACM/Springer Multimedia Systems: Special Issue on Multimedia Networking, (4)6:346-356, Dec. 1996

(Continued)

*Primary Examiner*—Edan Orgad
*Assistant Examiner*—Jung Park
(74) *Attorney, Agent, or Firm*—Blakely, Sokoloff, Taylor & Zafman LLP

(57) ABSTRACT

A method and apparatus for sorting packets by packet schedulers using a connected trie data structure is described. According to one embodiment of the invention, the packet scheduler receives a packet on a network and assigns the packet a time stamp value. The packet is inserted into a trie data structure that represents a scheduling horizon and includes a plurality of packets. The packet scheduler transmits the packet over the network based on its sorted order within the trie data structure.

43 Claims, 27 Drawing Sheets

OTHER PUBLICATIONS

H. Zhang and D. Ferrari, "Rate-Controlled Static-Priority Queueing", Proceedings of INFOCOM'93, San Francisco, CA, Apr. 1993 IEEE.

H. Zhang and S. Keshav, "Comparison of Rate-based Service Disciplines", Proceedings of ACM SIGCOMM'91, Zurich, Switzerland, Sep. 1991.

Jon C.R. Bennett and H. Zhang, "Hierarchical Packet Fair Queueing Algorithms", IEEE/ACM Transactions on Networking, 5(5):675-689, Oct. 1997. Also in Proceedings of SIGCOMM'96, Aug. 1996.

I. Stoica, H. Zhang and T. S. Eugene Ng, "A Hierarchical Fair Service Curve Algorithm for Link-Sharing, Real-Time and Priority Service", Proceedings of SIGCOMM'97.

Hyman, J.M., Lazar, A.A. and Pacifici, G., "Real-Time Scheduling with Quality of Service Constraints", IEEE Journal on Selected Areas in Communications, vol. SAC-9, No. 7, Sep. 1991, pp. 1052-1063.

Hyman, J.M., Lazar, A.A. and Pacifici, G., "A Separation Principle between Scheduling and Admission Control for Broadband Switching", IEEE Journal on Selected Areas in Communications, vol. 11, No. 4, May 1993, pp. 605-616.

D. Eckhardt, P. Steenkiste. "Effort-limited Fair (ELF) Scheduling for Wireless Networks", Proceedings of IEEE INFOCOM 2000, Tel Aviv, Israel.

S. Lu, V. Bharghavan and R. Srikant, "Fair Scheduling in Wireless Packet Networks", IEEE/ACM Transcations on Networking, vol. 7, No. 4, Aug. 1999, pp. 473-489.

David D. Clark, Scott Shenker, Lixia Zhang, "Supporting Real-Time Applications in an Integrated Services Packet Network: Architecture and Mechanism", SIGCOMM 1992.

P. Goyal, S.S. Lam, and H.M. Vin, "Determining End-to-End Delay Bounds in Heterogeneous Networks", Multimedia Systems (1997) 5: 157-163.

J. Kaur and H. Vin, "Core-stateless Guaranteed Throughput Networks", in Proceedings of IEEE INFOCOM, San Francisco, CA, Apr. 2003.

Ion Stoica, Scott Shenker, Hui Zhang, "Core-Stateless Fair Queueing: A Scalable Architecture to Approximate Fair Bandwidth Allocations in High Speed Networks", SIGCOMM'98.

Jon C.R. Bennett, Donpaul C. Stephens, Hui Zhang, "High Speed, Scalable, and Accurate Implementation of Packet Fair Queueing Algorithms in ATM Networks". ICNP'97.

H. J. Chao, Y. R. Jenq, X. Guo, and C. H. Lam, "Design of Packet Fair Queuing Schedulers Using a RAM-based Searching Engine", in IEEE J. Select. Areas Communications vol. 17, No. 6, pp. 1105-1126, 1999.

H. J. Chao, H. Cheng, Y. R. Jenq, and D. Jeong, "Design of a Generalized Priority Queue Manager for ATM Switches", IEEE J. Select. Areas Communications vol. 15, No. 5, pp. 867-880, Jun. 1997.

J. Liebeherr and D. E. Wrege, "Priority Queue Schedulers with Approximate Sorting in Output Buffered Switches", Proceedings of IEEE Infocom ' 97 [39], pp. 1-32.

Sung-Whan Moon, Jennifer Rexford, and Kang Shin, "Scalable Hardware Priority Queue Architectures for High-Speed Packet Switches," IEEE Trans. on Computers, vol. XX, No. Y, Month 2000, pp. 1-16.

Sung-Whan Moon, "Implementing Traffic Shaping and Link Scheduling on a High-Performance Server", 2001 IEEE, pp. 216-225.

Jennifer Rexford, Flavio Bonomi, Albert Greenberg, and Albert Wong, "Scalable Architectures for Integrated Traffic Shaping and Link Scheduling in High-Speed ATM Switches", IEEE Journal on Selected Areas in Communications, vol. 15, No. 5, Jun. 1997, pp. 938-950. An earlier version appeared in Proc. IEEE INFOCOM, Apr. 1997, pp. 1056-1064.

Jennifer Rexford, John Hall, and Kang G. Shin, "A Router Architecture for Real-Time Communication in Multicomputer Networks," IEEE Transactions on Computers, vol. 47, No. 10, Oct. 1998, pp. 1088-1101. An earlier version appeared in Proc. International Symposium on Computer Architecture, May 1996, pp. 237-246.

Jennifer Rexford, Albert Greenberg, and Flavio Bonomi, "Hardware-Efficient Fair Queueing Architectures for High-Speed Networks," Proc. IEEE INFOCOM, Mar. 1996, pp. 638-646.

S. Keshav, "An Engineering Approach to Computer Networking", Chapter 9, Addison Wesley, 1997, pp. 209-222.

P. van Emde Boas, R. Kaas and E. Zijlstra, "An O (nloglogn) On-Line Algorithm for the Insert-Extract Min Problem", Dec. 1974, pp. 1-27.

* cited by examiner

200 array of pointers to packets indexed by time stamps

210

| 1 | 2 | 3 | ... | 1234678 |

230

220

300

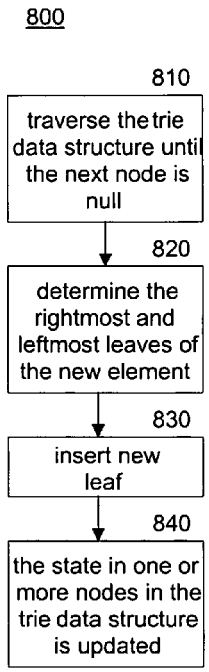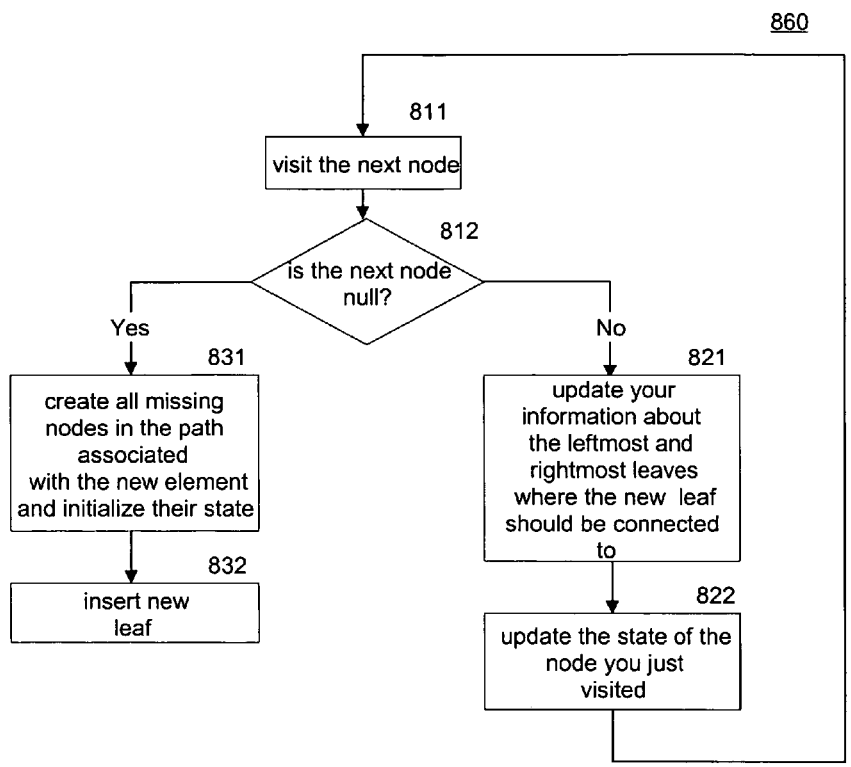
Figure 8A
Figure 8B

Figure 12
1265 — 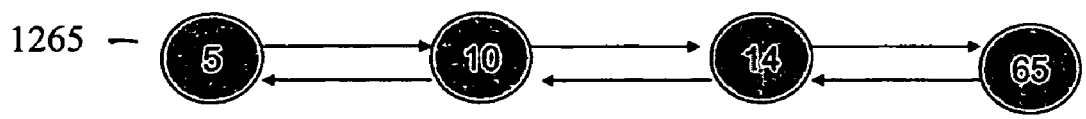
(a) linked list of leaves in the original implementation
1275 — 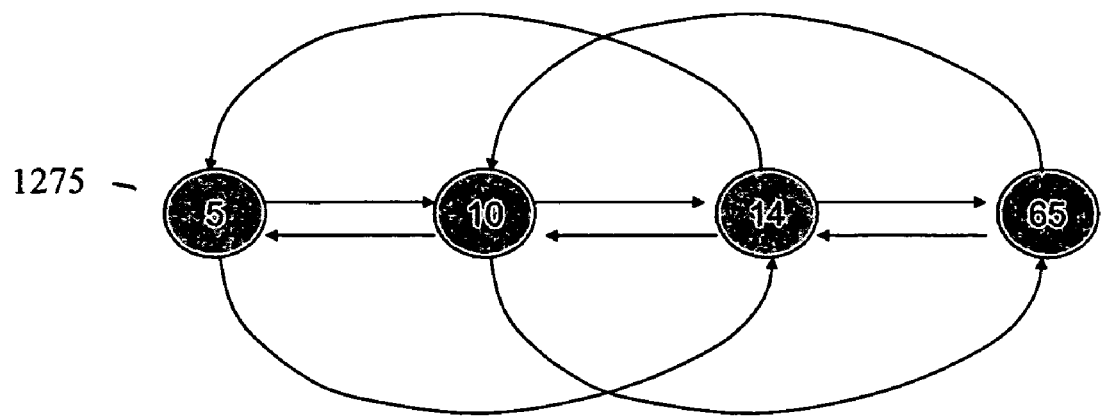
(B) linked list of leaves for meeting the OC-48 line rate at Castine

Figure 14  Enqueue Pseudocode Process flow 1400

MULTIBIT_INSERT_WITH_BITMAP(b, root)
1. $x \leftarrow root$
2. $i \leftarrow 1$
3. $r \leftarrow -\infty$
4. $l \leftarrow +\infty$
5. $R \leftarrow NULL$
6. $L \leftarrow NULL$
7. $m \leftarrow \log_2 c$                  ; number of bits we read at a time
8. $n \leftarrow$ new node            ; the new leaf node
9. $value[n] \leftarrow b$
10. while $i < h/m$
11.     do $j \leftarrow b[(i-1) \cdot m : i \cdot m]$
12.        $y \leftarrow child[j, x]$
13.        $p \leftarrow$ greatest index of element equal to 1 at the rightmost_value_bitmap[x] which is $p < j$
14.        $q \leftarrow$ lowest index of element equal to 1 at the leftmost_value_bitmap[x] which Is also $p > j$
15.          if $rightmost\_value[p, x] > r$
16.          then    $r \leftarrow rightmost\_value[p, x]$
17.                      $R \leftarrow rightmost\_leaf[p, x]$
18.          if $leftmost\_value[q, x] < l$
19.          then    $l \leftarrow leftmost\_value[q, x]$
20.                      $L \leftarrow leftmost\_leaf[q, x]$
21.        $rightmost\_value\_bitmap[j+1, x] \leftarrow 1$
22.        $leftmost\_value\_bitmap[j-1, x] \leftarrow 1$
23.        if $rightmost\_value[j+1, x] < b$
24.        then    $rightmost\_value[j+1, x] \leftarrow b$
25.                $rightmost\_leaf[j+1, x] \leftarrow n$
26.        if $leftmost\_value[j-1, x] > b$
27.        then $leftmost\_value[j-1, x] \leftarrow b$
28.                $leftmost\_leaf[j-1, x] \leftarrow n$
29.        if $y \neq NULL$
30.        then    $x \leftarrow y$
31.                 $i \leftarrow i+1$
32.        else    for $k = i + 1$ to $h/m$
33.                  do    $y \leftarrow$ new node
34.                         $child[j, x] \leftarrow y$
35.                         $parent[y] = x$
36.                         $j \leftarrow b[(k-1) \cdot m : k \cdot m]$
37.                         $rightmost\_value\_bitmap[y] \leftarrow 0$
38.                         $rightmost\_value\_bitmap[1, y] \leftarrow 1$
39.                         $rightmost\_value\_bitmap[j+1, y] \leftarrow 1$
40.                         $leftmost\_value\_bitmap[y] \leftarrow 0$
41.                         $leftmost\_value\_bitmap[c-2, y] \leftarrow 1$
42.                         $leftmost\_value\_bitmap[j-1, y] \leftarrow 1$
43.                         $rightmost\_value[1, y] \leftarrow r$
44.                         $rightmost\_leaf[1, y] \leftarrow R$
45.                         $rightmost\_value[j+1, y] \leftarrow b$
46.                         $rightmost\_leaf[j+1, y] \leftarrow n$
47.                         $leftmost\_value[c-2, y] \leftarrow l$
48.                         $leftmost\_leaf[c-2, y] \leftarrow L$
49.                         $leftmost\_value[j-1, y] \leftarrow b$
50.                         $leftmost\_leaf[j-1, y] \leftarrow n$
51.                         $child[j, y] \leftarrow NULL$
52.                         $x \leftarrow y$
53.                $child[j, x] \leftarrow n$
54.                $parent[n] = x$
55.                $leftmost\_leaf[c, R] \leftarrow n$  ; insert the leaf into the linked list
56.                $rightmost\_leaf[1, n] \leftarrow R$
57.                $rightmost\_leaf[1, L] \leftarrow n$
58.                $leftmost\_leaf[n] \leftarrow L$
59.                $i = h/m$
60. return $n$

Figure 15     Dequeue Pseudocode Process flow 1500

```
MULTIBIT_GET_NEXT(n)
1. x ← leftmost_leaf[c, n]
2. return value[n]
```

Figure 16

Initialization Pseudo-Code Process Flow 1610
    INITIALIZE ( )
      1. $root_1 \leftarrow$ CREATE()
      2. $root_2 \leftarrow$ CREATE()
      3. $min_1 \leftarrow$ NULL
      4. $min_2 \leftarrow$ NULL
      5. $T_1 \leftarrow 0$
      6. $T_2 \leftarrow D$ Enqueuing Pseudo-Code Process Flow 1620
    ENQUEUE (T)
      1. if $T > T_2$
      2.     then $n \leftarrow$ INSERT($(T-T_2)/W, root_2$)
      3.         if $min_2 =$ NULL
      4.             then    $min_2 \leftarrow n$
      5.     else $n \leftarrow$ INSERT($(T-T_1)/W, root_1$)
      6.         if $min_1 =$ NULL
      7.             then    $min_1 \leftarrow n$ Sorting Pseudo-Code Process Flow 1630
    SORT (T)
      1. wait till $min_1$ becomes non-null
      2. SORTING_ENGINE ($min_1$)
      3. TRANSMIT ($min_1$)
      4. $n \leftarrow$ GET_NEXT ($root_1$)
      5. if $min_1 =$ NULL    ; reached the tail of the linked list of the first connected trie
      6.    then free $root_1$
      7.         $min_1 \leftarrow min_2$
      8.         $root_1 \leftarrow root_2$
      9.         $T_1 \leftarrow T_2$
     10.        $T_2 \leftarrow T_1 + D$
     11.        $min_2 \leftarrow$ NULL
     12.        $root_2 \leftarrow$ CREATE()
     13. goto 2

Figure 20

CREATE PSEUDO-CODE PROCESS FLOW 2000

CREATE()
1. *parent*[*root*] ← NULL
2. *left_child*[*root*] ←NULL
3. *right_child*[*root*] ←NULL
4. *rightmost_leaf*[*root*] ←NULL
5. *rightmost_value*[*root*] ← $-\infty$
6. *leftmost_leaf*[*root*] ←NULL
7. *leftmost_value*[*root*] ← $+\infty$
8. return *root*

Figure 21      INSERT PSEUDO-CODE PROCESS FLOW 2100

INSERT ($b$, root)
1. $x \leftarrow$ root
2. $i \leftarrow 1$
3. $r \leftarrow -\infty$
4. $l \leftarrow +\infty$
5. $R \leftarrow$ NULL
6. $L \leftarrow$ NULL
7. n $\leftarrow$ new node; the new leaf node
8. value[n] $\leftarrow b$
9. while $i < h$
10.     do if b[i] = 0
11.         then $y \leftarrow left\_child[x]$
12.             if $leftmost\_value[x] < l$
13.                 then   $l \leftarrow leftmost\_value[x]$
14.                           $L \leftarrow leftmost\_leaf[x]$
15.             if $rightmost\_value[x] < b$
16.                 then   $rightmost\_value[x] \leftarrow b$
17.                           $rightmost\_leaf[x] \leftarrow n$
18.         else    $y \leftarrow right\_child[x]$
19.             if $rightmost\_value[x] > r$
20.                 then   $r \leftarrow rightmost\_value[x]$
21.                           $rightmost\_leaf[x]$
22.             if $leftmost\_value[x] > b$
23.                 then   $leftmost\_value[x] \leftarrow b$
24.                           $leftmost\_leaf[x] \leftarrow n$
25.         if $y \neq$ ,NULL
26.             then    $x \leftarrow y$
27.                       $i \leftarrow i + 1$
28.         else
29.             for $j = i + 1$ to $h$
30.                 do $y \leftarrow$ new node
31.                 if b[j] = 0
32.                 then
33.                       $rightmost\_value[y] \leftarrow b$
34.                       $rightmost\_leaf[y] \leftarrow n$
35.                       $leftmost\_value[y] \leftarrow l$
36.                       $leftmost\_leaf[y] \leftarrow L$
37.                       $left\_child[x] \leftarrow y$
38.                 else
39.                       $rightmost\_value[y] \leftarrow r$
40.                       $rightmost\_leaf[y] \leftarrow R$
41.                       $leftmost\_value[y] \leftarrow b$
42.                       $leftmost\_leaf[y] \leftarrow n$
43.                       $right\_child[x] \leftarrow y$
44.                       parent[y] = $x$
45.                     $x = y$
46.             if b[j] = 0
47.                 then $left\_child[x] \leftarrow n$ ,
48.                 else $right\_child[x] \leftarrow n$
49.         parent[n] $\leftarrow x$
50.         $leftmost\_leaf[R] \leftarrow n$
51.         $rightmost\_leaf[n] \leftarrow R$
52.         $rightmost\_leaf[L] \leftarrow n$
53.         $leftmost\_leaf[n] \leftarrow L$
54.         $i = h$
55. return n

Figure 22

GET_NEXT PSEUDO-CODE PROCESS FLOW 2200

GET_NEXT(*n)*
1. $x \leftarrow$ leftmost_leaf[$n$]
2. return *value*[$n$]

Figure 23

MULTIBIT_CREATE PSEUDO-CODE PROCESS FLOW 2300

MULTIBIT_CREATE()
1.     $parent[root] \leftarrow$ NULL
2.     for $i = 1$ to $c$
3.         do $child[i, root] \leftarrow$ NULL
4.             $rightmost\_leaf[i, root] \leftarrow$ NULL
5.             $leftmost\_leaf[i, root] \leftarrow$ NULL
6.             $rightmost\_value[i, root] \leftarrow -\infty$
7.             $leftmost\_value[i, root] \leftarrow +\infty$
8. return $root$

Figure 24  MULTIBIT INSERT PSEUDO-CODE PROCESS FLOW 2400

```
MULTIBIT_INSERT(b, root)
1.       x ← root
2.       i ← 1
3.       r ← − ∞
4.       l ← + ∞
5. R ← NULL
6. L ← NULL
7. m ← log2c
8. n ← new node ; the new leaf node
9. value[n] ← b
10. while i < h/m
11. do j ← b[(i-1) m : i m]
12.          y ← child[j, x]
13.          if leftmost_value[j, x] < l
14.                  then      l ← leftmost_value[j, x]
15.                            L ← leftmost_leaf[j, x]
16.          if rightmost_value[j, x] > r
17.                  then      r ← rightmost_value[j, x]
18.                            R ← rightmost_leaf[j, x]
19.
20.          for q = 1 to j-1
21.          do if leftmost_value[q, x] > b
22.                  then      leftmost_value[q, x] ← b
23.                            leftmost_leaf[q, x] ← n
24.          for q = j+1 to c
25.          do if rightmost_value[q, x] < b
26.                  then      rightmost_value[q, x] ← b
27.                            rightmost_leaf[q, x] ← n
28.          if y ≠ NULL
29.                  then x ← y
30.                  else for k = i + 1 to h/m
31.                       do        y ← new node
32.                                 child[j, x] ← y
33.                                 parent[y] = x
34.                                 j ← b[(k-1) m : k m]
35.                                 for q = 1 to j-1
36.                                 do rightmost_value[q, y] ← r
37.                                         rightmost_leaf[q, y] ← R
38.                                         leftmost_value[q, y] ← b
39.                                         leftmost_leaf[q, y] ← n
40.                                         child[q, y] ← NULL
41.                                 rightmost_value[j, y] ← r
42.                                 rightmost_leaf[j, y] ← R
43.                                 leftmost_value[j, y] ← l
44.                                 leftmost_leaf[j, y] ← L
45.                                 child[j, y] ← NULL
46.                                 for q = j+1 to c
47.                                 do        rightmost_value[q, y] ← b
48.                                           rightmost_leaf[q, y] ← n
49.                                           leftmost_value[q, y] ← l
50.                                           leftmost_leaf[q, y] ← L
51.                                           child[q, y] ← NULL
52.                                 x ← y
53.                                 child[j, x] ← n
54.                                 parent[n] = x
55.                                 leftmost_leaf[c, R] ← n
56.                                 rightmost_leaf[1, n] ← R
57.                                 rightmost_leaf[1, L] ← n
58.                                 leftmost_leaf[c, n] ← L
59.                                 i = h/m
60.          i ← i+1
61. return n
```

Figure 25

MULTIBIT_GET_NEXT PSEUDO-CODE PROCESS FLOW 2500

MULTIBIT_GET_NEXT(n)
1. $x \leftarrow leftmost\_leaf[c, n]$
2. return $value[n]$

METHOD AND APPARATUS FOR SORTING PACKETS IN PACKET SCHEDULERS USING A CONNECTED TRIE DATA STRUCTURE

TECHNICAL FIELD

Embodiments of the invention relate to the field of computer networking. More specifically, embodiments of the invention relate to the implementation of packet scheduling and the sorting of packets by packet schedulers using a connected trie data structure.

BACKGROUND

Packet scheduling is the process of deciding which packet to forward next into the communication link of a network node. Packet scheduling is often realized by annotating packets with time stamps (also referred to as 'tags', in this document) and subsequently sorting these packets according to their annotated time stamp values. While a number of approaches have been proposed that address the calculation of packet tags in scheduling algorithms, little work has been done addressing the complexity associated with sorting tagged packets. Existing approaches make a number of restrictive assumptions about packet sizes and allocated rates characterizing scheduled sessions or suffer from significant latency, space requirement, or processing power requirement. Existing approaches to sorting can be grouped into three categories: the first category includes schemes that use general purpose data structures for sorting packets and for extracting the packet with a minimum tag. These approaches make no assumptions about the incoming sessions. The most representative of these schemes are: (i) the binomial heaps; (ii) the Fibonacci heaps; (iii) the Van Emde Boas trees; (iv) the tree of comparators; and (v) the calendar queue. While these approaches demonstrate good asymptotic complexity for extracting the minimum tag packet (e.g., Fibonacci heaps are associated with θ(1) complexity) these algorithms are usually inefficient to implement due to the fact that their complexity functions involve large constants.

A second category of algorithms makes assumptions about sessions. These approaches usually group sessions according to their packet sizes and allocated rates. These approaches reduce the overall complexity of the enqueuing process from sorting tags across sessions to sorting tags across groups. Such approaches include: (i) the approximate sorting approach; (ii) the sorting bins scheme from AT&T; and (iii) the connection grouping scheme from Carnegie Mellon University (CMU).

FIG. 1 illustrates a prior art sorting scheme using a tree of comparators 100. The tree of comparators 100, divides the number of sessions into groups. For each group, a comparator algorithm selects a head-of-line packet with a minimum tag. The tagged packets selected from a first stage of comparators 110 are further divided into groups and passed into a second stage of comparators 130. The second stage of comparators 130 further reduces the number of candidate packets which may be annotated with a minimum tag. The process is continued until only one packet remains at the final stages of comparators 150. When a new head-of-line packet enters the system, comparisons do not need to be made across all sessions but only within a small number of groups, equal to the height of the tree. This approach is associated with logarithmic complexity (i.e., O(log N)) as a function of the number of sessions in the system N.

FIG. 2 illustrates a prior art sorting scheme using a calendar queue 200. The calendar queue 200 maintains an array of pointers 210 to packets, where each entry in the array is indexed by a separate time stamp value. Time stamp values may be consecutive. Packets are ideally inserted in O(1) time in a queue 220 during the enqueuing process and a scheduler 230 selects the next packet for transmission in a single step, at best case. The main drawback of the calendar queue 200 is its memory storage requirement. Memory explosion may be caused by the need to store a separate entry in the array for every distinct time stamp value a packet may be associated with. If the range of time stamp values is large, then the calendar queue 200 may require a significant amount of storage space.

FIG. 3 illustrates a prior art sorting scheme using approximate sorting 300. In this approach, the range of time stamp values is divided into smaller ranges and queues 320 are created for storing packets. Packets annotated with time stamp values in the same range are stored in the same queue 320. Inside, the queue packets are stored in a FIFO order. The scheduler prioritizes queues but not packets within queues. This approach is called "approximate sorting" since packets are coarsely classified into groups of different time stamp ranges. This approach has the benefit of simplifying both the enqueuing and the dequeuing processes at the expense of the level of fairness characterizing the scheduler. A scheduling algorithm that uses approximate sorting is not fair over a short time scale because the correct transmission order of packets (i.e., the transmission order according to Generalized Processor Sharing (GPS)) is violated.

Other schemes have been proposed that impose a number of restrictive assumptions on the size of packets and range of rates allocated to sessions. For example, ATM networks carry packets of fixed sizes and hence ATM network solutions can be thought of as simplifying the enqueuing and dequeuing process significantly.

BRIEF DESCRIPTION OF THE DRAWINGS

The invention may best be understood by referring to the following description and accompanying drawings that are used to illustrate embodiments of the invention. In the drawings:

FIG. 8a and 8b illustrate embodiments of a trie data structure traverse process flow to insert a new element into a trie data structure having a link list;

FIG. 12 illustrates one embodiment of a linked list of leaves for meeting high speed line rates;

FIG. 14 illustrates one embodiment of an enqueue pseudo-code process flow;

FIG. 15 illustrates one embodiment of an dequeue pseudo-code process flow;

FIG. 16 illustrates one embodiment of an initialization pseudo-code process flow, an enqueuing pseudo-code process flow, and a sorting pseudo-code process flow;

FIG. 20 illustrates one embodiment of a create pseudo-code process flow;

FIG. 21 illustrates one embodiment of a insert pseudo-code process flow;

FIG. 22 illustrates one embodiment of a Get_Next pseudo-code process flow;

FIG. 23 illustrates an exemplary pseudo-code process flow of a Multibit_Create pseudo-code process flow;

FIG. 24 illustrates an exemplary pseudo-code process flow of a Multibit_Insert pseudo-code process flow; and FIG. 25 illustrates an exemplary pseudo-code process flow of a Multibit_Get_Next pseudo-code process flow.

DETAILED DESCRIPTION

Figure 1:
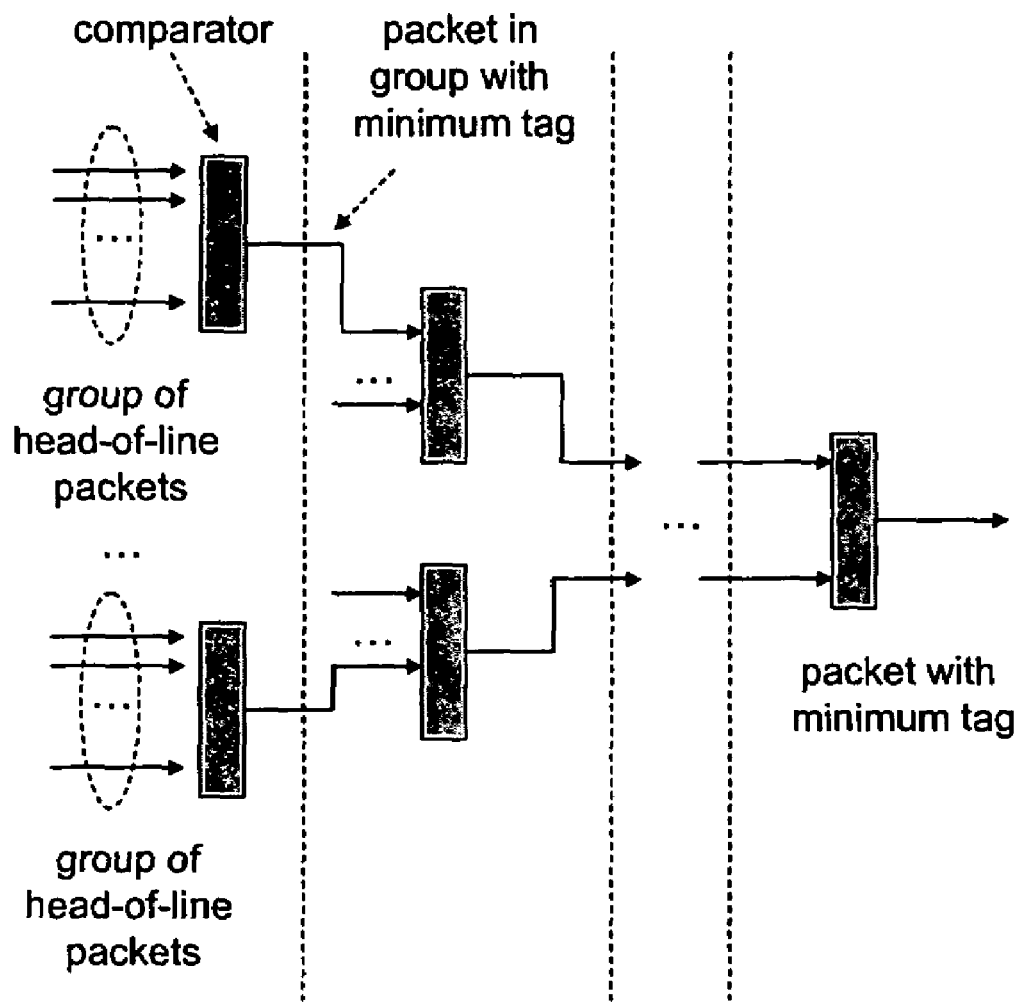
FIG. 1 illustrates a prior art sorting scheme using a tree of comparators.
Figure 2:
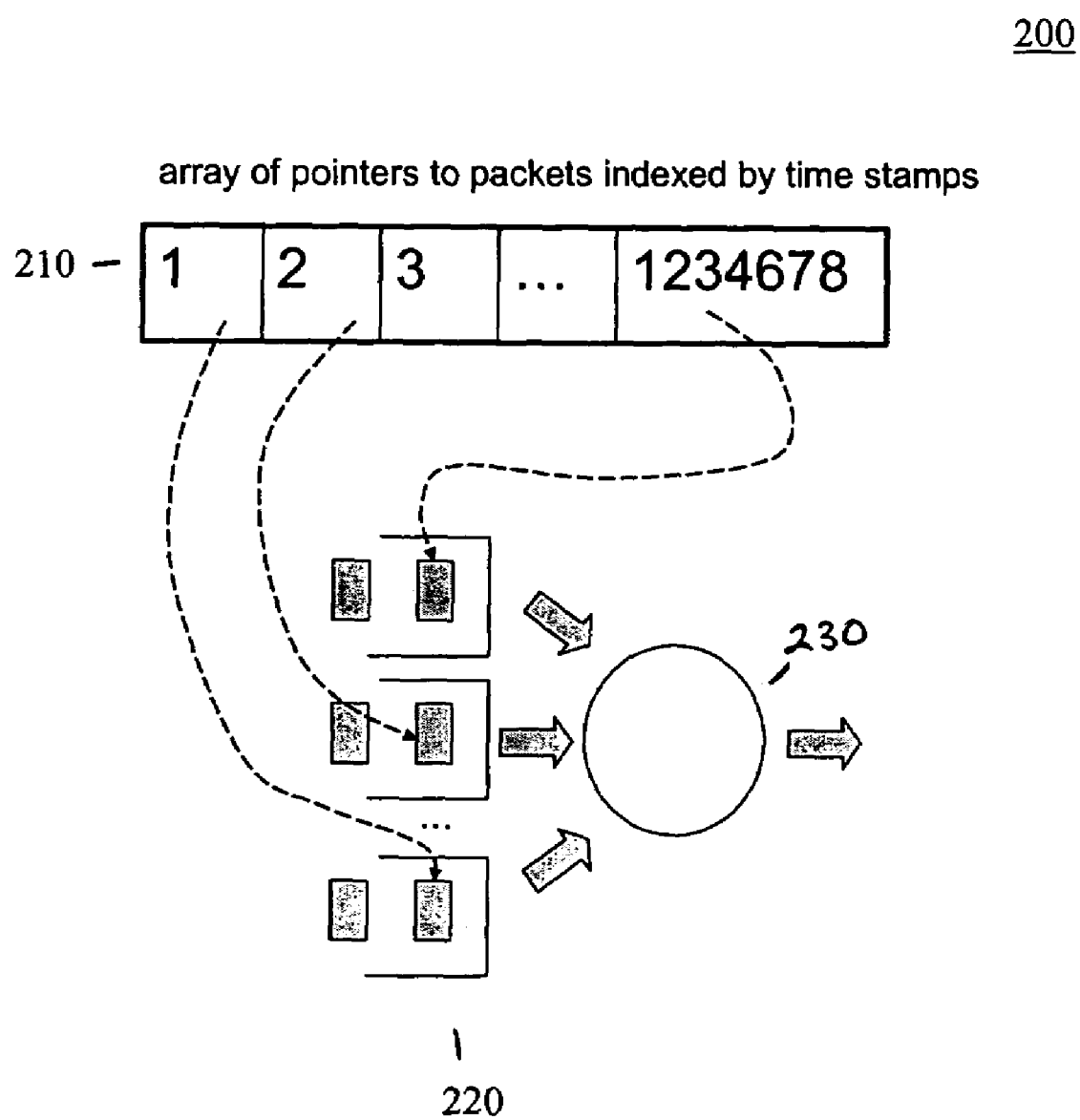
FIG. 2 illustrates a prior art sorting scheme using a calendar queue.
Figure 3:
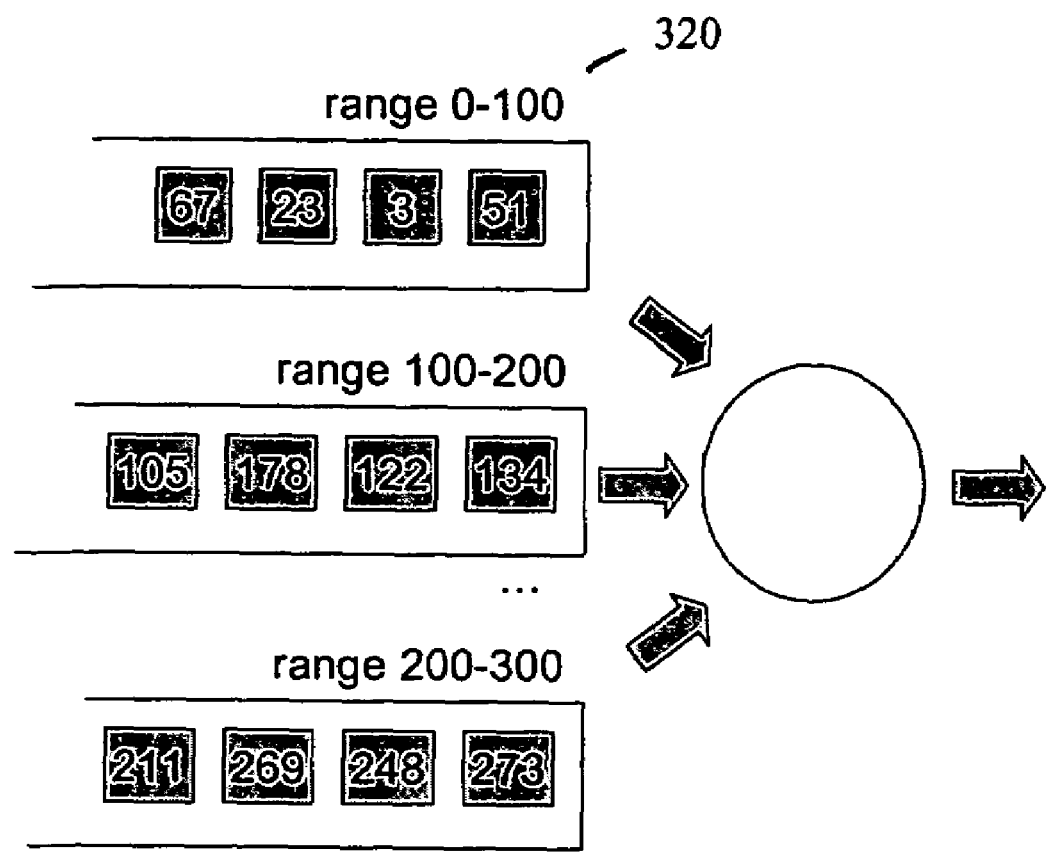
FIG. 3 illustrates a prior art sorting scheme using approximate sorting.

In the following description, numerous specific details are set forth. However, it is understood that embodiments of the invention may be practiced without these specific details. In other instances, well-known circuits, structures and techniques have not been shown in detail in order not to obscure the understanding of this description.

Packet Scheduling Process

A method and apparatus for the sorting of packets by packet schedulers using a connected trie data structure is described. More specifically, the following disclosure relates to the design, implementation, and evaluation of packet scheduling algorithms for network node systems such as routers, switches, base stations or servers. Scheduling algorithms constitute fundamental building blocks of modern network architectures that support intelligent bandwidth management. Networks that use scheduling can typically offer resource assurances in the form of quality of service agreements (QoS) to their end-systems. Packet scheduling is the process of determining which packet to forward next among a set of incoming packets. Packets associated with different flows usually compete to acquire some portion of a router's output link resources. Packet scheduling usually requires complex implementations. The complexity stems from the fact that these algorithms need to tag packets with time stamps and, subsequently, sort these packets according to their annotated time stamp values. Time stamps denote the order in which packets need to be forwarded to output links based on the level of QoS packet flows received.

It should be understood that terminology used in this detailed description with respect to node is used to describe any part of a graph representing the trie data structure where two or more edges meet. A node can be a root node, a leaf node or an intermediate node. The term element is used to describe a numerical value stored at a leaf of a connected trie data structure. As will be described, elements have values between 0 and a scheduling horizon, D. The term packet describes a collection of bits that travel together through a communications network. In one embodiment, a packet is associated with a numerical value (i.e., an element) when inserted into a connected trie data structure. More than one packet however may by associate with the same element. In one embodiment, packets are stored in FIFO queues in the leaves of connected trie data structures as described below in conjunction with FIG. 6.

In some packet schedulers the annotated time stamps, also called 'finish numbers', denote the virtual times when an emulated Generalized Processor Sharing (GPS) server finishes servicing packets. However, it is understood that a time stamp is not necessarily given at the time a packet is received by a router. A time stamp may be given at the time a packet is received by a router or may be calculated at a later time. Calculating time stamps for packets is not easy. The reason why such calculation is difficult is because the value of the virtual time function used by packet fair queuing algorithms at a particular instance of time depends on the number and weights of sessions backlogged at every instance in the interval between the beginning of the operation and the time when the virtual time function is calculated.

For example, The formal definition of the virtual time function V(t) used by the GPS algorithms is given below, in Eq. 1:

$$V(t) = \int_0^t \frac{r(\tau)}{\sum_{i \in B_{GPS}(\tau)} \varphi_i} d\tau \quad [1]$$

where, $t_0$ is the beginning of the operation of the packet scheduler, $r(\tau)$ is the rate provided by the server in the interval $[t_0, t]$, $\varphi_i$ is the weight associated with connection i and $B_{GPS}(t)$ is the set of connections which are backlogged at instance t. From the definition of Eq. 1, it is clear that V(t) represents the normalized amount of service each connection receives in the interval $[t_0, t]$. To derive the actual amount of service each connection receives, it is suffice to multiply V(t) with each connection's weight $\varphi_i$.

Sorting algorithms are typically associated with logarithmic complexity as a function of the number of elements (e.g., packets) to sort. Hence, well-known sorting techniques (e.g., heaps, calendar queues, trees of comparators) often exceed the space and time budgets associated with network node systems (e.g., network processor-based routers). The following description describes a Connected Trie data structure for sorting packets in packet schedulers. In the connected Trie data structure, packets are placed into regions of time stamps. A region may hold just one packet space or multiple packets. Placing packets into time stamp regions is challenging for two reasons. First some regions may be empty. This can happen because no packets may arrive with finish numbers contained into some regions of time stamps. Efficient scheduling requires finding the next non-empty region quickly enough so as to provide the scheduler with packets 'on time'. This operation may require a significant amount of memory access, however. Second, the number of regions stored in the system could be large, in the order of the number of head-of-line packets in the system, or in the order of the number of different time stamp values. Therefore, the following will describe ways to design an efficient sorting scheme to organize and manage time stamp regions efficiently.

Figure 4A:
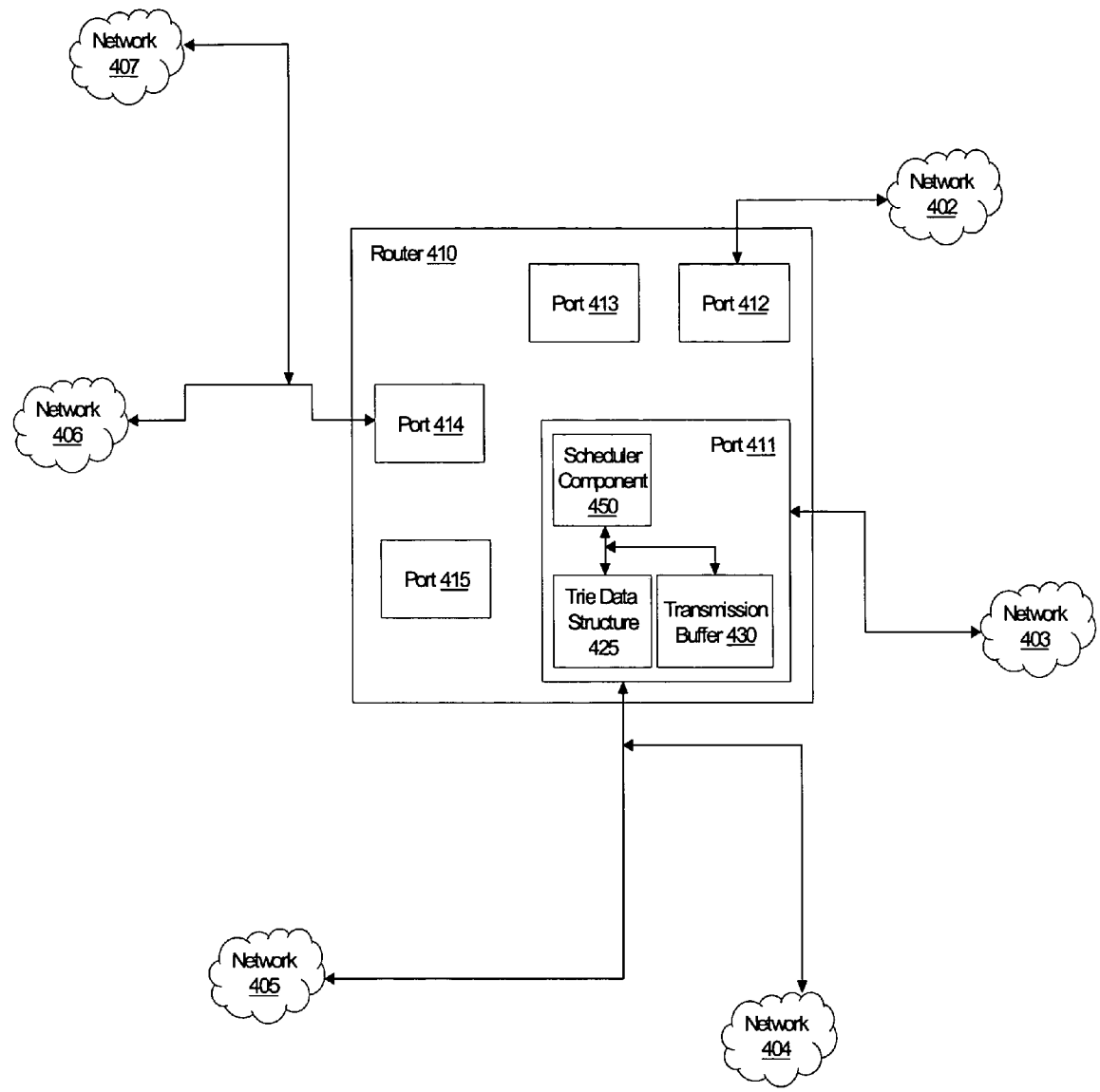
FIG. 4A illustrates one embodiment of a network environment.

FIG. 4A illustrates one embodiment of a network environment 400. The network environment 400 includes communication networks 402, 403, 404, 405, 406, and 407 that carry packet traffic through a router 410. The communication networks may include for example, local, metropolitan or wide area networks, and virtual private networks, among other types of communication networks well known to those of ordinary skill in the art including the Internet.

The router 410 includes a set of ports 411, 412, 413, 414 and 415 which process incoming and outgoing traffic. Port 411 includes the scheduler component 450. It is understood that embodiments of the invention can be applied to many different types of router systems with arbitrary number of ports, where one or multiple ports may include scheduler components. Whereas, in FIG. 4A, only port 411 includes a scheduler component, the invention is not so limiting and other ports may include a scheduler component as well. The scheduler component 450 includes software instructions that enable the router to receive, organize, and transmit packets over a communications network (402, 403, 404, 405, 406, and 407) using a connected trie data structure 425 and a transmission buffer 430, as will be described further below.

Figure 4B:
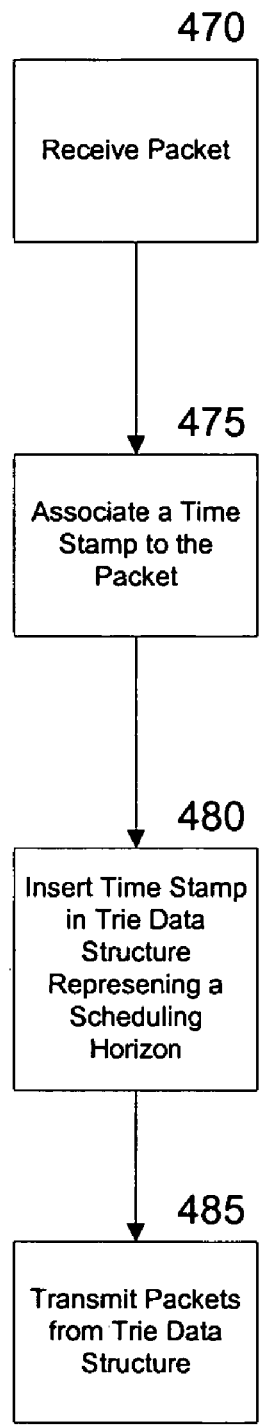
FIG. 4B illustrates one embodiment of a packet scheduling process flow using the trie data structure.

For example, FIG. 4B illustrates one embodiment of a packet scheduling process flow 460 using the trie data structure 425. At block 470, the scheduler component 450 receives a packet from the network.

At block 475, the scheduler component 450 associates a time stamp (e.g., finishing number) to the packet. In one embodiment, the scheduler component 450 may use a particular policy for tagging packets (e.g., Self Clocked Fair Queuing (SCFQ)) scheduling discipline. In addition, the router server 410 may be defined with N network connections $(c_1, c_2, \ldots, c_N)$, where each is associated with a weight value $\phi_i$, $i \in [1, N]$. Without loss of generality, weight values may be constraint to be between zero and one, for example, such that their sum is exactly equal to one. Furthermore, assuming $\phi_{min} = \min_i \in [1, N] \phi_i$. The sizes of packets in the router server 410 may be considered variable ranging from $p_{min}$ to $p_{max}$ bytes. Because the scheduling discipline is SCFQ, the finish number of each head-of-line packet $F_i$ differs from the finish number F of the packet currently in service by a value $D_i$ of:

$$D_i = F_i - F = \frac{p_i}{\varphi_i} \quad [2]$$

where $p_i$ is the size of the packet and $\phi_i$ is the weight of its associated connection. During the transmission of the first packet in the scheduler component 450, connections may become backlogged. The maximum difference D between the finish number of any head-of-line packet that arrives during the transmission of the first packet in the scheduler and the finish number of the first packet is equal to:

$$D = \frac{p_{max}}{\varphi_{min}} \quad [3]$$

Figure 5:
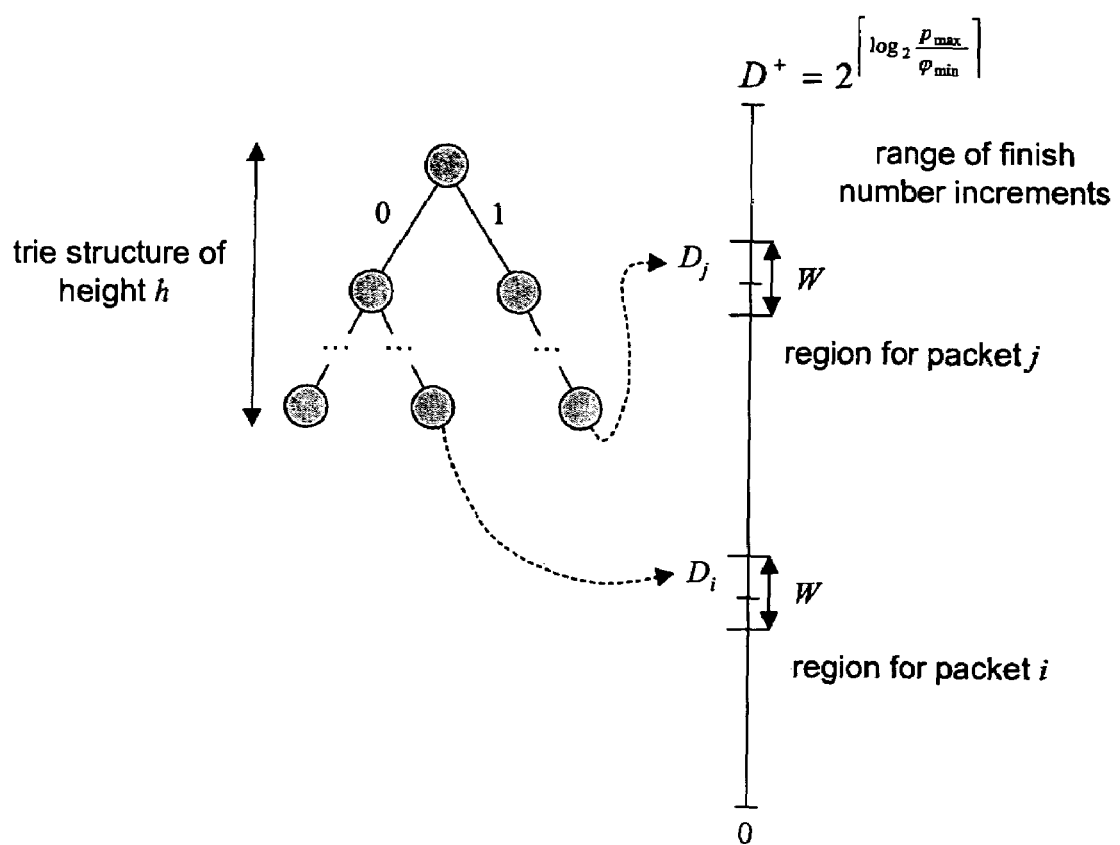
FIG. 5 illustrates one embodiment of a trie data structure of height h.

D is often called a "scheduling horizon". The scheduling horizon is defined in general as the maximum difference between the finish number of any head-of-line packet that arrives during the transmission of some packet in the scheduler and the finish number of the packet which is being transmitted. It should be made clear that the concept of the scheduling horizon is generic and can be defined for disciplines other than SCFQ. In embodiments where the service discipline is not SCFQ the scheduling horizon cannot be derived from Eq. 3, however. FIG. 5 illustrates one embodiment of a trie data structure 425 of height h.

At block 480, the scheduler component 450 inserts the packet in a trie data structure 425. Examples of inserting and sorting the packets in the trie data structure are described below in conjunction with FIGS. 5-19.

At block 485, the scheduler component 450 transmits each packet in the trie data structure 425. For example, during this transmission process (e.g., dequeuing), the scheduler component 450 may select the packet with the smallest finish number and send this packet to the output link. After a packet is transmitted, the scheduler component 450 selects the packet with the next smallest finish number for transmission. The time that the scheduler component 450 has to select the next packet may be limited due to the requirement of meeting high-speed line rates. In one embodiment, to reduce the cost and complexity of the dequeuing process, the packets are sorted in an ordered list according to the values of their virtual finish times. If packets are ordered in this manner, the scheduler component 450 needs only select a packet from the head of the ordered list.

The description below will describe embodiments of how to organize the regions of time stamps for the head-of-line packets that arrive during the transmission of the first packet in the scheduler component 450. Once a solution for the first packet is computed, a solution for any packet can be generalized as will be described.

Since a goal related to scheduling is the relative order of transmission of packets and not their finish number values, in one embodiment, the relative order of packets can be derived from the values of the differences $D_i$ as well as the values of the finish numbers $F_i$. Each value $D_i$ denotes the difference between the finish number of packet i and the finish number of the packet currently in service. $D_i$ may range between 0 and D, where D is the scheduling horizon given from Eq. 3. $D_i$ is called the 'finish number increment' for packet i.

Figures 6A, 6B:
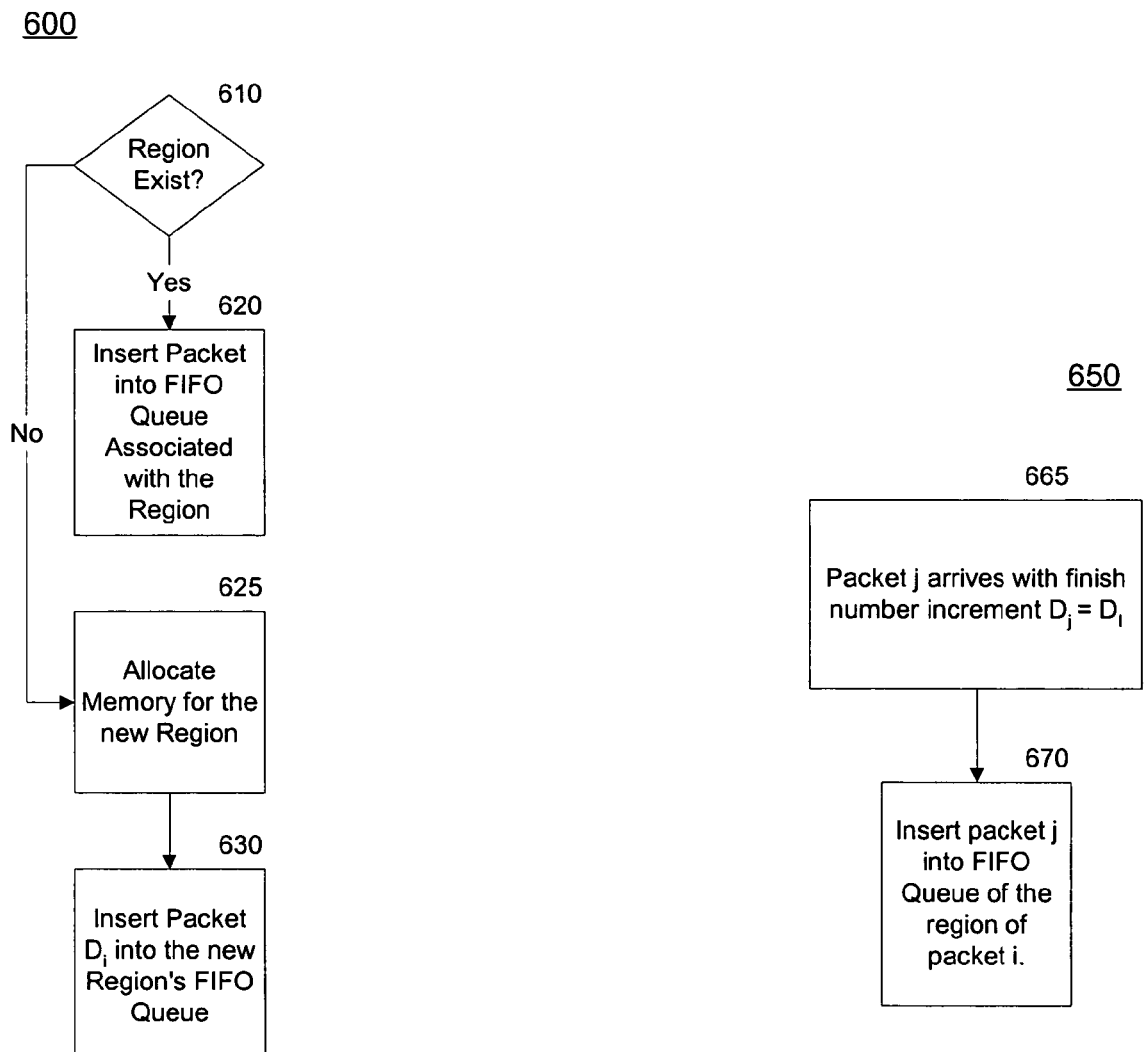
FIG. 6A illustrates one embodiment of a region allocation process flow for allocating memory for regions in the trie data structure as illustrated in conjunction with FIG. 5.
FIG. 6B illustrates one embodiment of a region insertion process flow for inserting a packet into a region of the trie data structure as illustrated in conjunction with FIG. 5.

FIG. 6A illustrates one embodiment of a region allocation process flow 600 for allocating memory for regions in the trie data structure 425 as illustrated in conjunction with FIG. 5. The dynamic allocation and deallocation of memory for regions of time stamps is useful because it can potentially avoid the memory explosion problem related to maintaining a large number of regions in the router 410. Regions contain the values of finish number increments and not the actual time stamps of packets.

At block 610, the scheduler component 450 checks if a region is currently allocated that contains the value of the finish number increment $D_i$ of packet i upon receiving a new head-of-line packet. If the scheduler component 450 determines a region exists, control passes to block 620. If the scheduler component 450 determines a region does not exist, control passes to block 625. At block 620, the scheduler component 450 inserts the packet to a FIFO queue associated with this region. At block 625, the scheduler component 450 allocates memory for a new region. The new region should contain the finish number increment $D_1$. At block 630, the scheduler component 450 inserts the packet with finish number increment $D_i$ into the FIFO queue of the newly allocated region.

FIG. 6B illustrates one embodiment of a region insertion process flow 650 for inserting a packet into a region of the trie data structure. At block 665, the scheduler component 450 receives a packet j with finish number increment $D_j$ in the region of packet i. At block 670, the scheduler component 450 inserts packet j into the FIFO of the region of packet i. Hence, the scheduler component 450 need not allocate memory for a region for packet j.

By dynamically allocating and deallocating memory for regions of time stamps, memory explosion is avoided. There are three issues related to dynamic memory allocation, however. First, how to define the width of each region. Second, how to check if a region exists for an incoming head-of-line packet. Third, once the packets of a region are sorted or transmitted, how to determine the next region to process. Determining if a value is included into a set of ranges is a classification problem. Hence, solutions to the problem of classification in a single dimension (i.e., the dimension of finish number increments) can be used, for example. As disclosed, the following will investigate the use of a single dimensional trie data structure 425 for determining if a region exists for a packet.

The following describes a solution where regions have fixed size. Let's assume that each region of finish number increments has fixed width W<D. Setting:

$$D^+ = 2^{\lceil \log_2 D \rceil} \quad [4]$$

$D^+$ is the smallest power of two that is greater or equal to the maximum finish number increment D. Without loss of generality, it is understood that the width of each region is also a power of 2. Therefore, W<D<D$^+$. The maximum number of regions that can be allocated inside the range [0, D$^+$] is equal to:

$$R = \frac{D^+}{W} \quad [5]$$

To dynamically allocate and search for regions of finish number increments the trie data structure 425 of height is needed as defined by:

$$h = \log_2 R \quad [6]$$

Figure 7:
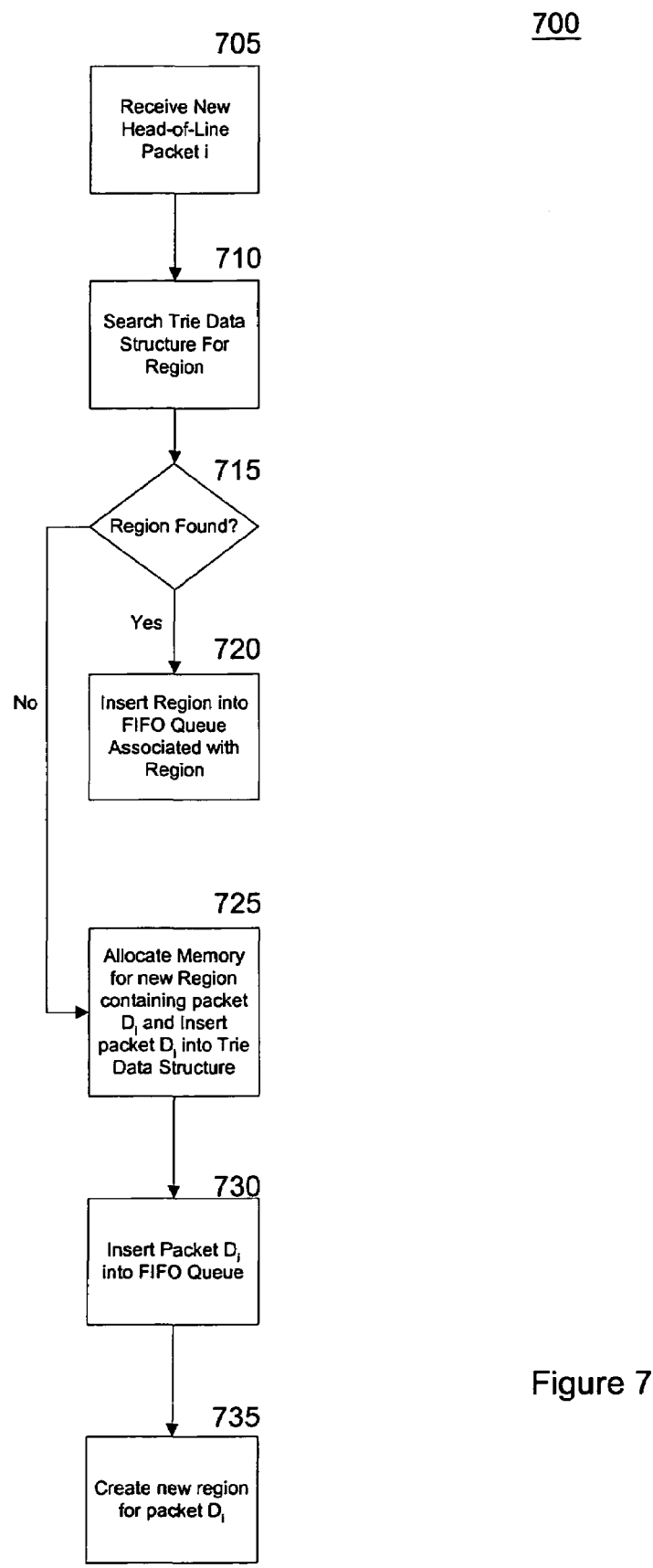
FIG. 7 illustrates one embodiment of a search regions process flow for searching for and inserting regions of finish number increments on the trie data structure.

FIG. 7 illustrates one embodiment of a search regions process flow 700 for searching for and inserting regions of finish number increments on the trie data structure 425.

At block 705, the scheduler component 450 receives a new head-of-line packet i during the transmission of the first packet in the router server 410.

At block 710, the scheduler component 450 performs a search of the trie data structure 425 of height h for a region associated with the packet. For example, the search may be made using the h most significant bits of the finish number increment $D_i$ of packet i.

At block 715, the scheduler component 450 determines if a region is found in the trie structure. If the scheduler component 450 determines the region is found in the trie data structure 425, control passes to block 720. If the scheduler component 450 determines the region is not found in the trie structure, control passes to block 725.

At block 720, the scheduler component 450 inserts the packet into the FIFO queue of that region. At block 725, the scheduler component 450 allocates an entry for a new region containing $D_i$ and adds the entry into the trie structure. In this way, the entry is created. At block 730, the scheduler component 450 inserts the packet $D_i$ into the FIFO of that region. At block 735, the scheduler component 450 creates a new region for packet $D_i$ that includes all finish number increments that have their h most significant bits equal to the h most significant bits of value $D_i$. These are all numbers in the range:

$$\left[ \left\lfloor \frac{D_i}{W} \right\rfloor \cdot W, \left( \left\lfloor \frac{D_i}{W} \right\rfloor + 1 \right) \cdot W \right] \quad [7]$$

One issue that needs to be resolved in the design of the trie data structure is how to find the next non-empty region of finish number increments. Using a trie data structure as a priority queue requires traversing the trie data structure toward the root and back in order to find the leaf with the next smallest value. Such a solution however, may require a significant number of memory accesses, since in the worst case, the number of steps involved in finding the next non-empty region may be equal to double of the height of the tree 2h. In this detail description the design of a data structure is investigated that balances the performance benefit that comes from quickly traversing the branches of a trie data structure against the cost of introducing additional amount of state in the nodes. Also, by adding a small number of additional pointers and numerical values in each node of a trie data structure allows for the leaf nodes to be connected together using doubly connected linked lists.

FIG. 8A illustrates one embodiment of a trie data structure traverse process flow 800. The process flow 800 inserts a new element into a trie data structure having a linked list. At block 810, the scheduler component 450 traverses the trie data structure from the root toward the leaves until the next node is null. For example, it is evident that at some point in the trie data structure, a node where the next node to follow is null will be encountered. This happens because the element inserted into the trie data structure has not been included in the data structure before.

At block 820, the scheduler component 450 determines the rightmost and leftmost lraves where the new leaf should be connected to based on the state stored with the node.

At block 830, the scheduler component 450 inserts the new leaf. Finally at block 840 the state in one or more nodes in the trie data structure. In one embodiment, for example, the scheduler component maintains connectivity information consisting of two pointers. The first of the pointers points to the rightmost leaf that contains an element lower than the element inserted in the trie data structure 425. The second pointer points to the leftmost leaf that contains an element greater than the element inserted in the trie data structure. In this way the new element is inserted into the linked list of leaves in O(1) time once the path for the new leaf is created. It should be made clear that the embodiment consisting of blocks 810, 820, 830 and 840 represents only but one way to traverse the connected trie data structure and insert a new element.

At block 840, the scheduler component 450 updates the state of one or more nodes on the trie data structure. For example, as the new element is inserted into the trie data structure, the state in some of the nodes needs to be updated.

In one embodiment, the state is updated as the trie is traversed from the root toward the leaves during the insertion operation. In this manner, revisiting the nodes of the trie data structure is avoided after the insertion is completed.

In an alternative embodiment, FIG. 8B illustrates one embodiment of a trie data structure traverse process flow 860 for updating of the state of the trie data structure on a node by node basis as the traversal progresses. At block 811, the scheduler component 450 visits a next node. At block 812 the scheduler component 450 checks whether the visited node is null. If the node is null, then the scheduler component 450 creates all missing nodes in the path associated with the new element and initializes their state. These processes take place at block 831. At block 832, the schedule component 450 inserts a new leaf into the trie data structure. If the next node is not null, the scheduler component 450 updates its information about the leftmost and rightmost leaves where the new leaf should be connected at block 821. In this way, information updates take place on a node-by-node basis. At block 822, the scheduler component 450 updates the state of the node which has been previously visited at block 811. The process flow 860 returns to block 811 where the node in the path is visited. The process flow 840 is also shown in more detail in the Insert pseudo-code process flow 2100.

In one embodiment, each node n maintains connectivity and states information consisting of a total of seven fields: aparent[n] pointer, pointing to the parent node; a left_child[n] pointer, pointing to the left child of the node; a right_child[n] pointer, pointing to the right child of the node; a rightmost_leaf[n] pointer, pointing to the rightmost leaf that contains an element lower than any element inserted in the trie data structure by traversing the right child of the node; a rightmost_value[n] field containing the value of the element which is stored in the leaf where rightmost_leaf[n] points to; a leftmost_leaf[n] pointer, pointing to leftmost leaf that contains an element greater than any element inserted in the trie data structure by traversing the left child of the node; and a leftmost_value[n] field containing the value of the element which is stored in the leaf where leftmost_leaf[n] points to.

The rightmost_value[n] and leftmost_value[n] fields can take two special values which are denoted as $-\infty$ and $+\infty$ respectively. If rightmost_value[n] is equal to $-\infty$, this means that no leaf element in the trie data structure exists with a value lower than the value of any new element that could be inserted by traversing n. In this case, the new element becomes the head of the linked list. If leftmost_value[n] is equal to $+\infty$, this means that no leaf element in the trie exists with value greater than the value of any new element that could be inserted by traversing n. In this case, the new element becomes the tail of the linked list. Because the leaf nodes form a doubly connected linked list, it may be call a "connected trie."

In is understood that the trie data structure manages state at the nodes of the trie data structure so that every node down to the level where the traversal is stopped contains two additional pointers. These pointers point to the rightmost and leftmost leaves in the linked list where a new leaf should be inserted.

FIGS. 20, 21, and 22 illustrate exemplary pseudo-code process flows of the Create pseudo-code process flow 2000, the Insert pseudo-code process flow 2100, and the Get_Next pseudo-code process flow 2200 according to one embodiment of the connected trie data structure. The Insert pseudo-code process flow 2100 describes one embodiment of the process flow 860. the node-by-node state update process of blocks 811, 812, 832, 832, 821 and 822. The pseudo-code process flow for the alternative embodiment of blocks 810, 820, 830 and 840 is not shown herein for the sake of simplicity.

In one embodiment, the Create pseudo-code process flow 2000 initializes the root of the trie data structure, setting the pointers of the left and right children to NULL, the rightmost_value field to $-\infty$ and the leftmost_value field to $+\infty$.

In one embodiment, the Insert pseudo-code process flow 2100 takes as input, an h-bit long binary number b and traverses the trie data structure parsing one bit at a time. The traversal stops until a node is found where the next node to follow is null (line 25). During the traversal, the algorithm 'discovers' which are the rightmost and leftmost leaves in the linked list where the new leaf should be connected to (lines 12-14 and 19-21). The way the algorithm discovers the rightmost and leftmost leaves where the new leaf should be connected $t_0$ is as follows: The algorithm maintains a pair of leaves L, R and a pair of values r, l. L and R are initialized to null, whereas l is initialized to $+\infty$ and r is initialized to $-\infty$. At each visited node of the trie data structure, the algorithm checks if the leftmost_value field of that node is smaller than l. If it is smaller, then the value of l is replaced by the value of the leftmost_value field of the visited node. In this case, L is also assigned the leftmost_leaf field of the visited node. The values of R and r are updated in a similar manner. During the traversal the algorithm also updates the state stored at the nodes from the root down to the node where the traversal is stopped (lines 15-17 and 22-24). The way the state is updated is as follows: the algorithm checks whether the new leaf n will be added following the left path (i.e., the path marked with 'zero') or the right path (i.e., the path marked with 'one') from the node where the state is updated. If the path followed is the left path, then the algorithm updates the rightmost_leaf and rightmost_value fields at that node. These two fields are replaced by a pointer to the new leaf node n and the binary number b respectively.

An update takes place only in the case where the rightmost_value at the node is lower than b (lines 15-17). The state is updated in a symmetrical manner, in case the path followed is the right path (lines 22-24). The reason why the state is updated in this way is to help with connecting future leaves into the linked list of the trie data structure. A future leaf, for example, may need to be connected either to the left or to the right of leaf n. In this case, the algorithm will obtain the information that n is the leftmost or rightmost leaf for the future node during the traversal of the trie data structure. After the state is updated in all nodes from the root down to the node where the traversal is stopped, the remaining nodes in the path are created and the leaf is connected at the end of the path (lines 29-54). State information is initialized at the new nodes of the trie data structure (lines 33-45). Finally, the new leaf node n is inserted into the doubly linked list of the leaves (lines 50-53). The way the Insert pseudo-code process flow 2100 works is explained using an example below.

The Get_Next pseudo-code process flow 2200 procedure takes as input, a leaf node n and returns the leaf node associated with the next highest element stored in the trie data structure. The Get_Next pseudo-code process flow 2200 can find the leaf associated with the next highest element in a single step (line 1).

Figure 9A:
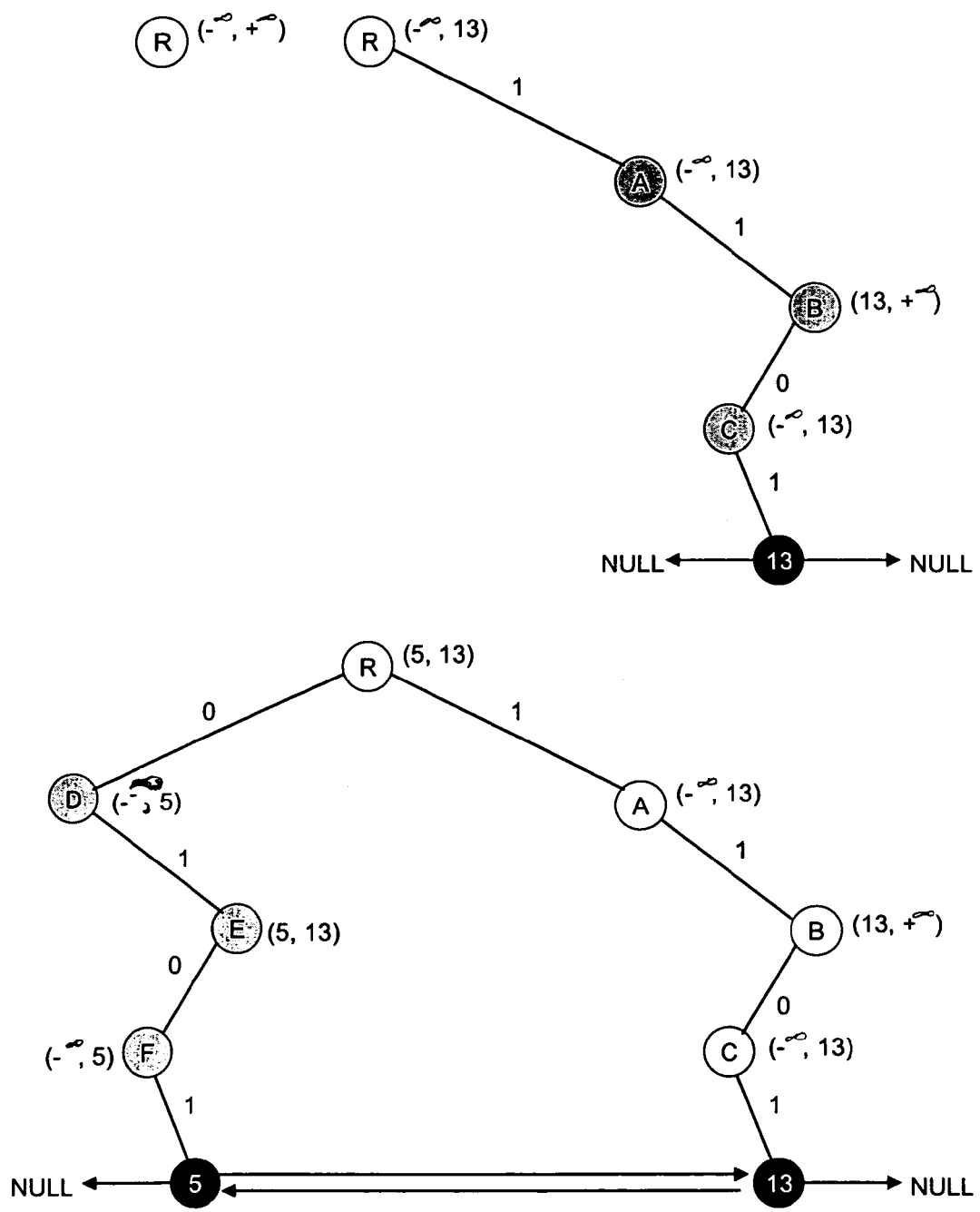
FIGS. 9a and 9b show how four elements can be inserted into a connected trie and form a doubly connected linked list.
Figure 9B:
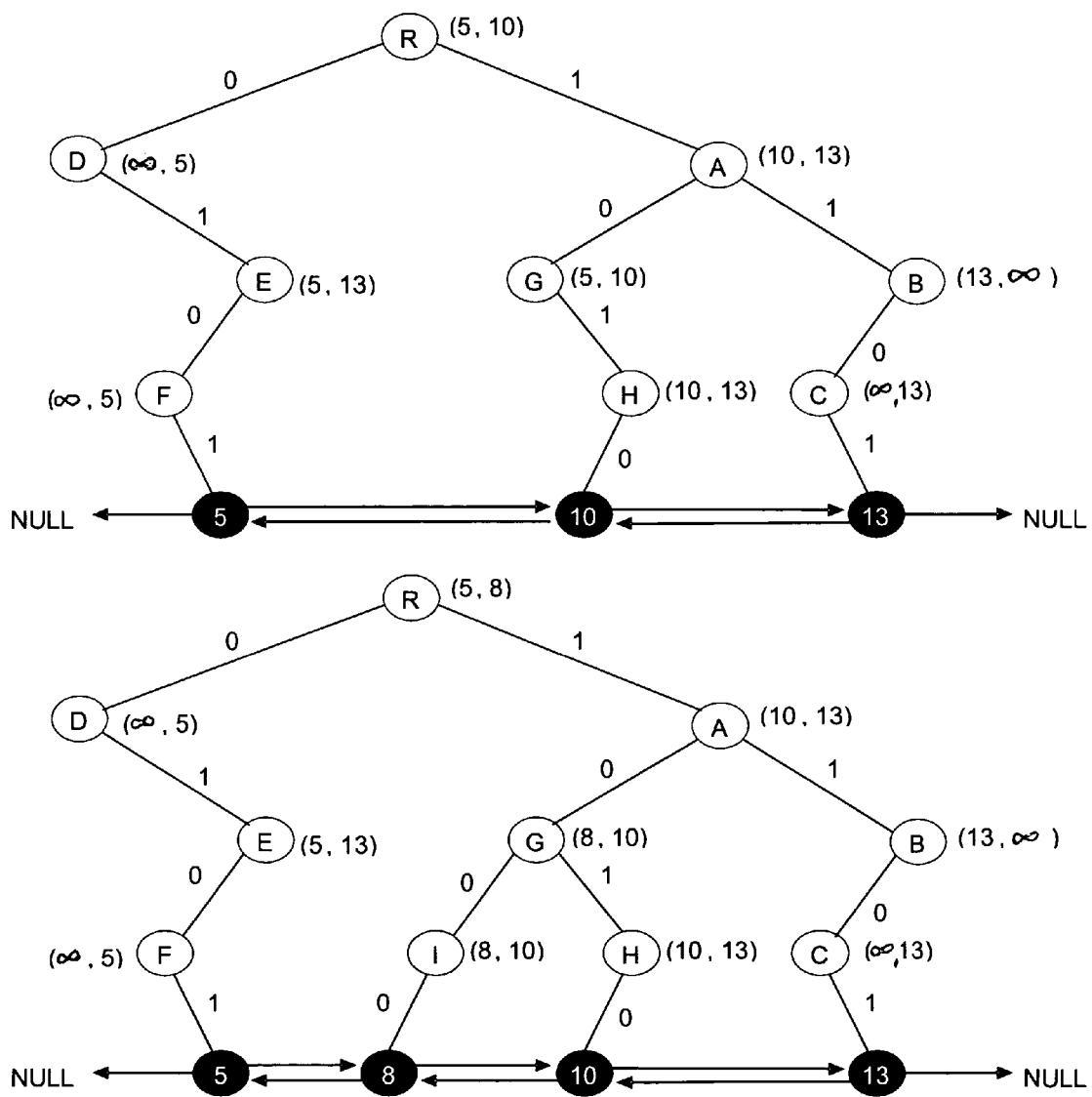

An example of inserting nodes into a connected trie data structure is further illustrated in conjunction with FIGS. 9a and 9b. FIGS. 9a and 9b show how four elements 13, 5, 10 and 8 can be inserted into a connected trie data structure and form a doubly connected linked list. Initially, only the root node R exists in the trie data structure as shown in FIG. 9a. The rightmost_value and leftmost_value fields stored at the root are $(-\infty, +\infty)$ initially. The leaf node with value 13 is inserted into the trie data structure as shown in FIG. 9a. During this insert operation, nodes A, B, and C are created. The leftmost_value field at the root is updated to 13, since 13 is lower than $+\infty$. The leftmost_value and rightmost_value fields at nodes A, B, and C are initialized as shown in the figure. The next number to be inserted is 5. The insertion of number 5 into the trie data structure results in the creation of nodes D, E, and F as shown in FIG. 9a. The state at the root is further updated during the traversal, since 5 is greater than $-\infty$. The next numbers to be inserted are 10 and 8. Number 10 is added resulting in the creation of the intermediate nodes G and H, as illustrated in FIG. 9b. The state is updated at the root R to reflect the fact that number 10 is greater than any number inserted by traversing the root to the left. The state is also updated in a similar manner at node A. Finally, the insertion of leaf node 8 results in updating the state at nodes R and G and the creation of node I.

The connected trie data structure can be modified so that it is traversed at a faster pace. If m bits are read at a time, each node in the multi-bit trie data structure needs to be connected to $c=2^m$ children. The penalty paid for faster traversal is that additional state information at each node of the trie data structure needs to be managed. Instead of maintaining only two pointers and two numerical values at each node, 2c-2 pointers and 2c-2 numerical values for multi-bit traversal are needed. The single-bit and multi-bit connected trie data structures, as described further below, can be used for locating the region of finish number increments where a new head-of-line packet should be inserted.

In one embodiment, the solution applies to the head-of-line packets that arrive during the transmission of the first packet in the router server 410 as stated earlier. To generalize the solution to any packet, it is suffice to understand that during the transmission of packets with finish number increments from 0 to the D, any arriving head-of-line packet cannot have finish number increments larger than 2D, where D is the scheduling horizon defined by Eq. 3. In one embodiment, this happens because every incoming head-of-line packet is not tagged with a time stamp value lower than the time stamp of the packet currently in service. During the transmission of the first packet in the scheduler component 450, packets may arrive with finish number increments ranging from 0 to D. During the transmission of any such packet i, having finish number increment $D_i$, $0 \leq D_i \leq D$, any new incoming head-of-line packet cannot have finish number increments larger than $D_i$ plus the scheduling horizon D. Hence, in the worst case, the largest finish number increment arriving during the transmission of packets with increments from 0 to D is equal to 2D. Due to the above, a system for placing packets into time stamp regions may be built by using two connected tries at a time.

In one embodiment, the connected trie data structure 425 requires updating the rightmost value, rightmost leaf, leftmost value and leftmost leaf fields of c-1 child nodes at each step of the traversal, where c is the number of children of each node. During state updates, the fields of one or more child nodes are replaced by the value and leaf pointer of the new element inserted into the trie data structure.

In one embodiment, to change the pace at which the connected trie data structure is traversed, CREATE, INSERT, and GET_NEXT procedures are modified as shown in conduction with FIGS. 23, 24, and 25 below. FIGS. 23, 24, and 25 illustrate exemplary pseudo-code process flows of the Multibit_Create pseudo-code process flow 2300, the Multibit_Insert pseudo-code process flow 2400, and the Multibit_Get_Next pseudo-code process flow 2500. These procedures are similar to the procedures of the single-bit trie described in conjunction with FIGS. 20, 21, and 22. Modifications have been made however, because more than two alternative paths may be followed at every node of the trie data structure.

Figure 10:
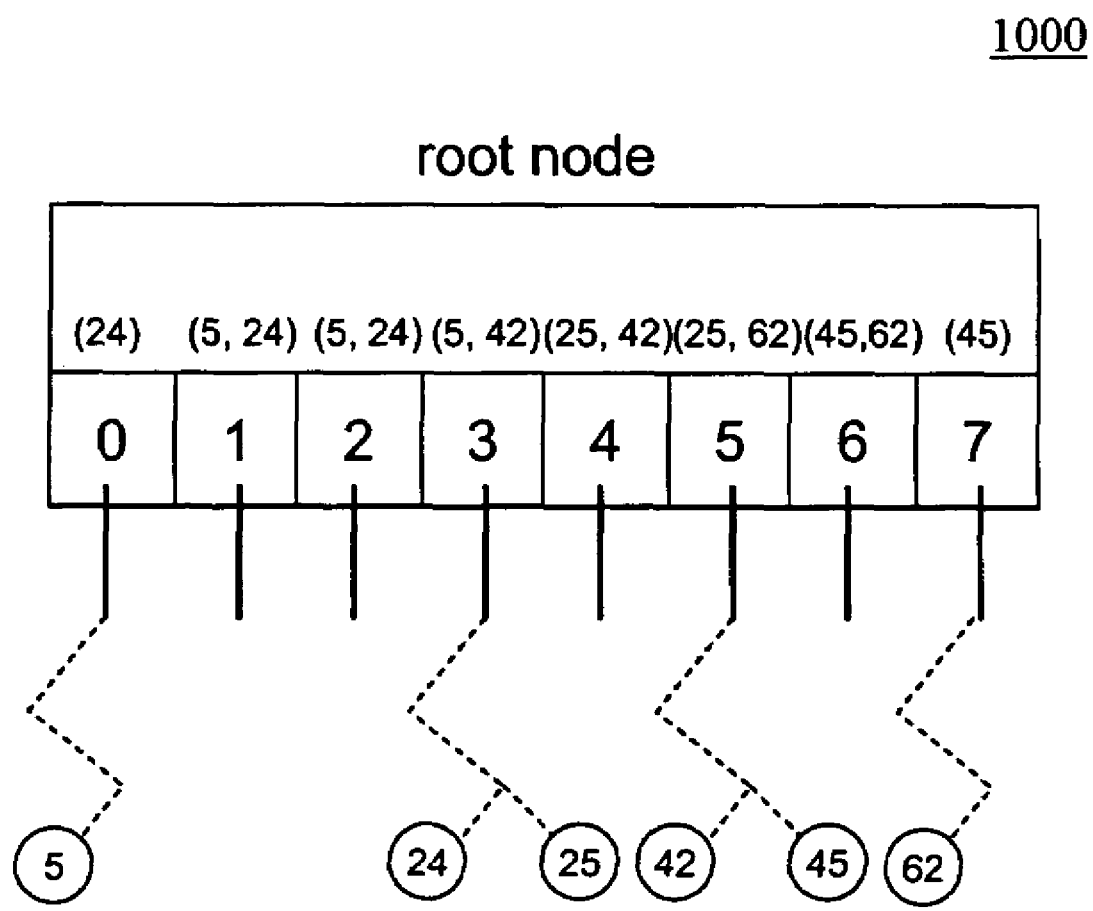
FIG. 10 illustrates one embodiment of a root node of a 3-bit connected trie data structure.

FIG. 10 illustrates one embodiment of a root node 1000 of a 3-bit connected trie data structure. The root node 1000 illustrates the state of a trie data structure in terms of the (rightmost_value, leftmost_value) pairs of the fields associated with each child node of the trie data structure.

In one embodiment, to initialize the root node 1000, half of the numerical values are initialized to $-\infty$, whereas the other half are initialized to $+\infty$. Each node i of a multi-bit connected trie data structure maintains connectivity and state information for every child node j, $0 \leq j \leq c$. In one embodiment, the node state information includes, but is not limited to, five fields: a child[j, i] pointer, pointing to child j of node i; a rightmost_leaf[j, i] pointer, pointing to the rightmost leaf that contains an element lower than any element inserted in the trie data structure by traversing node i through child node j; a rightmost_value[j, i] field containing the value of the element which is stored in the leaf where rightmost_leaf[j, i] points to; a leftmost_leaf[j, i] pointer, pointing to leftmost leaf that contains an element greater than any element inserted in the trie data structure by traversing node i through node j; and a leftmost_value[n] field containing the value of the element which is stored in the leaf where leftmost_leaf[j, i] points to.

In one embodiment, child node 0 does not need to store the rightmost_leaf and rightmost_value fields. This happens because the elements added by traversing node 1 are lower than all other elements in the trie data structure. Similarly, child node 7 does not need to store the leftmost_leaf and leftmost_value fields. This happens because the elements added by traversing node 7 are greater than all other elements in the trie. In one example, root node 1000 is shown to connect the elements 5, 24, 25, 42, 45 and 62 into a trie data structure. For each child node, the rightmost_value field indicates the greatest (i.e., the rightmost) of all elements stored in the trie data structure that are lower than any element added by following the child node. The values of the rightmost_value fields associated with the children of the root are as shown in Table 1:

TABLE 1

The rightmost_value Fields of the Child Nodes of the Root

| | child node | | | | | | | |
|---|---|---|---|---|---|---|---|---|
| | 0 | 1 | 2 | 3 | 4 | 5 | 6 | 7 |
| rightmost_value | N/A | 5 | 5 | 5 | 25 | 25 | 45 | 45 |

Similarly, for each child node, the leftmost_value field indicates the lowest (i.e., the leftmost) of all elements stored in the trie data structure that are greater than any element added by following the child node. The values of the leftmost_value fields associated with the children of the root are as follows:

TABLE 2

The leftmost_value Fields of the Child Nodes of the Root

| | Child node | | | | | | | |
|---|---|---|---|---|---|---|---|---|
| | 0 | 1 | 2 | 3 | 4 | 5 | 6 | 7 |
| rightmost_value | 24 | 24 | 24 | 42 | 42 | 62 | 62 | N/A |

Figure 11:
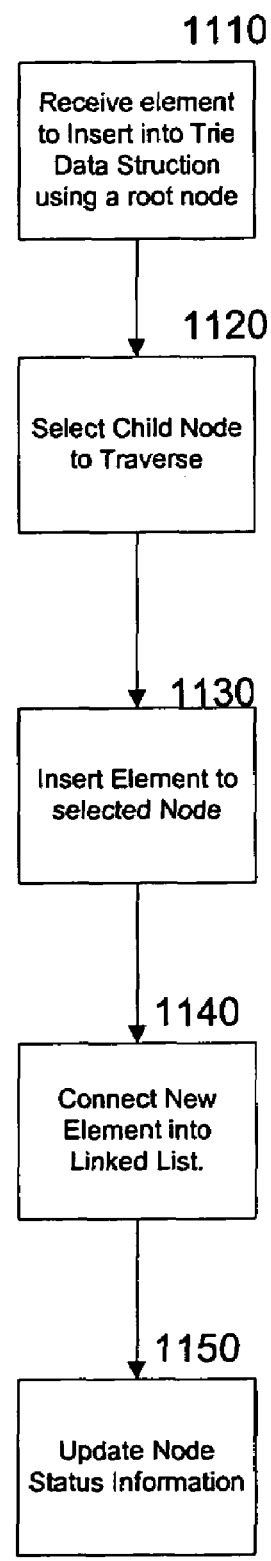
FIG. 11 illustrates one embodiment of an insertion process flow for updating the root node of a trie data structure.

FIG. 11 illustrates one embodiment of an insertion process flow 1100 for updating the root node 1000 of a trie data structure.

At block 1110, the scheduler component 450 receives an element to insert into the trie data structure.

At block 1120, the scheduler component 450 selects a child node to insert the element based on the node status information. For example, the scheduler component 450 will inspect the rightmost_value and the leftmost_value of each child node to determine the child node to insert the new element as further described below in conjunction with tables 1, 2, 3, and 4. In another example, the scheduler component 450 uses bitmap values as described below in conjunction with tables 5, 6, 7, and 8.

At block 1130, the scheduler component 450 inserts the new element at the selected child node. At block 1140, the scheduler component 450 connects the new element to an ordered linked list of leaf nodes in the trie data structure. An example of a linked list of leaves is illustrated below in conjunction with FIG. 12(a) and 12(b). At block 1150, the scheduler component 450 updates the nodes of the trie data structure.

The following illustrates an example of inserting a new element 33 into the trie data structure as described in conjunction with FIG. 11. Element 33 is inserted by following child node 4 of the root node 1000. Since no path is attached to node 4, a new path is created by linking element 33 into the root node. In addition, element 33 is inserted into a doubly connected linked list between elements 25 and 42. At the root of the trie data structure, the insertion procedure checks if 33 is greater than the rightmost_value field of child nodes 5, 6 and 7. In the example of FIG. 10, number 33 is greater than the rightmost_value field of child node 5. Therefore a state update takes place at the root replacing the rightmost_value and rightmost_leaf fields of child node 5 with a value and pointer to the new element 33. In a similar manner, the insertion procedure checks if 33 is lower than the leftmost_value field of child nodes 0, 1, 2 and 3. In the example of FIG. 10, number 33 is lower than the leftmost_value field of child node 3. Therefore, a state update takes place at the root replacing the leftmost_value and leftmost_leaf fields of child node 3 with a value and pointer to the new element 33. The updated state at the root node is shown in Tables 3 and 4, where changes in the state of the root node are marked with bold characters (e.g., child node 5 with rightmost_value 33 and child node 3 with rightmost value 33, respectively).

TABLE 3

The Updated rightmost_value Fields of the Child Nodes of the Root

| | Child node | | | | | | |
|---|---|---|---|---|---|---|---|
| 0 | 1 | 2 | 3 | 4 | 5 | 6 | 7 |
| rightmost_value N/A | 5 | 5 | 5 | 25 | 33 | 45 | 45 |

TABLE 4

The Updated leftmost_value Fields of the Child Nodes of the Root

| | Child node | | | | | | |
|---|---|---|---|---|---|---|---|
| 0 | 1 | 2 | 3 | 4 | 5 | 6 | 7 |
| rightmost_value 24 | 24 | 24 | 33 | 42 | 62 | 62 | N/A |

In one embodiment, the procedure described above may be computationally intensive based on the computing power of the router server 410 and may result in a significant number of memory accesses and compute cycles. Therefore, the following describes one embodiment of a scheme that uses a bitmap compression technique to accelerate the performance of the connected trie data structure 425. The scheme uses two bitmaps implemented as single-dimensional bit arrays. The size of each array in bits is equal to the number of children of each node of the connected trie data structure. The first of the two bitmaps, called the 'rightmost_value bitmap' provides information about the rightmost_value fields of child nodes. The second bitmap, called the 'leftmost_value bitmap' provides information about the leftmost_value fields of child nodes. Bit i of the rightmost_value bitmap is equal to 1 if the rightmost_value of child node i−1 is different from the rightmost_value of child node i. Similarly, bit i of the leftmost_value bitmap is equal to 1 if the leftmost_value of child node i+1 is different from the leftmost_value of child node i. Bit 0 of the rightmost_value bitmap and bit c−1 of the leftmost_value bitmap are always equal to 0.

TABLE 5

The rightmost_value Bitmap of the Root Node before the Insertion of Element 33

| | child node | | | | | | |
|---|---|---|---|---|---|---|---|
| 0 | 1 | 2 | 3 | 4 | 5 | 6 | 7 |
| rightmost_value bitmap 0 | 1 | 0 | 0 | 1 | 0 | 1 | 0 |

TABLE 6

The leftmost_value Bitmap of the Root Node before the Insertion of Element 33

| | child node | | | | | | |
|---|---|---|---|---|---|---|---|
| 0 | 1 | 2 | 3 | 4 | 5 | 6 | 7 |
| leftmost_value bitmap 0 | 0 | 1 | 0 | 1 | 0 | 1 | 0 |

TABLE 7

The rightmost_value Bitmap of the Root Node after the Insertion of Element 33

| | child node | | | | | | |
|---|---|---|---|---|---|---|---|
| 0 | 1 | 2 | 3 | 4 | 5 | 6 | 7 |
| rightmost_value bitmap 0 | 1 | 0 | 0 | 1 | 1 | 1 | 0 |

Tables 5 and 6 show the rightmost_value and leftmost_value bitmaps associated with the trie data structure node of FIG. 10 before the insertion of element 33 respectively. Tables 7 and 8 show the same bitmaps after the insertion of element 33. Changes in the bitmaps are marked with bold characters (e.g., child node 5 with rightmost value bitmap 1, and child node 3 with leftmost_value bitmap 1, respectively). The benefit of using the bitmaps comes from the simplification of the state update process. The insert procedure does not need to check and update the state of all child nodes, in the worst case, if bitmaps are used. Instead, the insert procedure needs to only check the state of two child nodes and update the state information about two nodes and the bitmaps. In this way the number of compute cycles and memory accesses involved in the trie data structure traversal is significantly reduced.

The following is an example of how the modified insert procedure works. Let's assume that i, $0 \leq i \leq c-1$, is the index of the next node to follow at some step of the trie data structure traversal. At this stage, the child node is determined with the greatest index at the rightmost_value bitmap which is equal to 1 and its index is lower than i. The rightmost_value field of the node found in this way is compared against the latest estimation of the rightmost leaf where our new element should be connected to. The latest estimation of the rightmost leaf is updated if the rightmost_value field of the node is greater. Next, the value of the bitmap is set at position i+1 to 1. Finally, a comparison of the rightmost_value field associated with node i+1 with the new element is inserted into the trie data structure. If the element is greater than the rightmost_value field at node i+1, that field is updated. The update of state for the leftmost_value field is done in a similar manner.

The insert procedure using bitmap compression needs to perform only four checks and four assignment statements at each stage of the traversal. This is a significant improvement over the prior art implementation where checks and updates are required for every child node apart from the subsequent node in the path.

TABLE 8

The leftmost_value Bitmap of the Root Node after the Insertion of Element 33

| | child node | | | | | | | |
|---|---|---|---|---|---|---|---|---|
| | 0 | 1 | 2 | 3 | 4 | 5 | 6 | 7 |
| Leftmost_value bitmap | 0 | 0 | 1 | 1 | 1 | 0 | 1 | 0 |

FIG. 14 illustrates one embodiment of an enqueue pseudo-code process flow 1400 and FIG. 15 illustrates one embodiment of a dequeue pseudo-code process flow 1500. In the description of procedure MULTIBIT_INSERT_WITH_BITMAP, the symbol rightmost_value_bitmap[j, i] is used to refer to element j of the rightmost_value bitmap of node i. Similarly the symbol leftmost_value_bitmap[j, i] is used to refer to element j of the leftmost_value bitmap of node i.

The following investigates whether it is possible to meet high speed line rates with the connected trie data structure at router systems and especially network processor-based routers. The following describes an exemplary example of meeting the well known OC-48 line rate which is equal to 2.5 Gigabit per second. Fetching the next packet for transmission using the connected trie data structure requires one memory access. The network processor headroom in many different network processor architectures, however, is less than a single memory access time. To meet the line rate, it is suffice that the rate of obtaining the next packet for transmission be doubled. In one embodiment, to double this rate, the manner in which each leaf in the linked list of the trie data structure is connected to its neighbors is changed. Furthermore, the linked list of leaves can be arranged as shown in FIG. 12. In the figure each leaf node (1265, 1275) is connected to the previous two and the next two leaves. In one embodiment, the linked list 1275 can be used for meeting the well-known OC-48 line rate.

Figure 13:
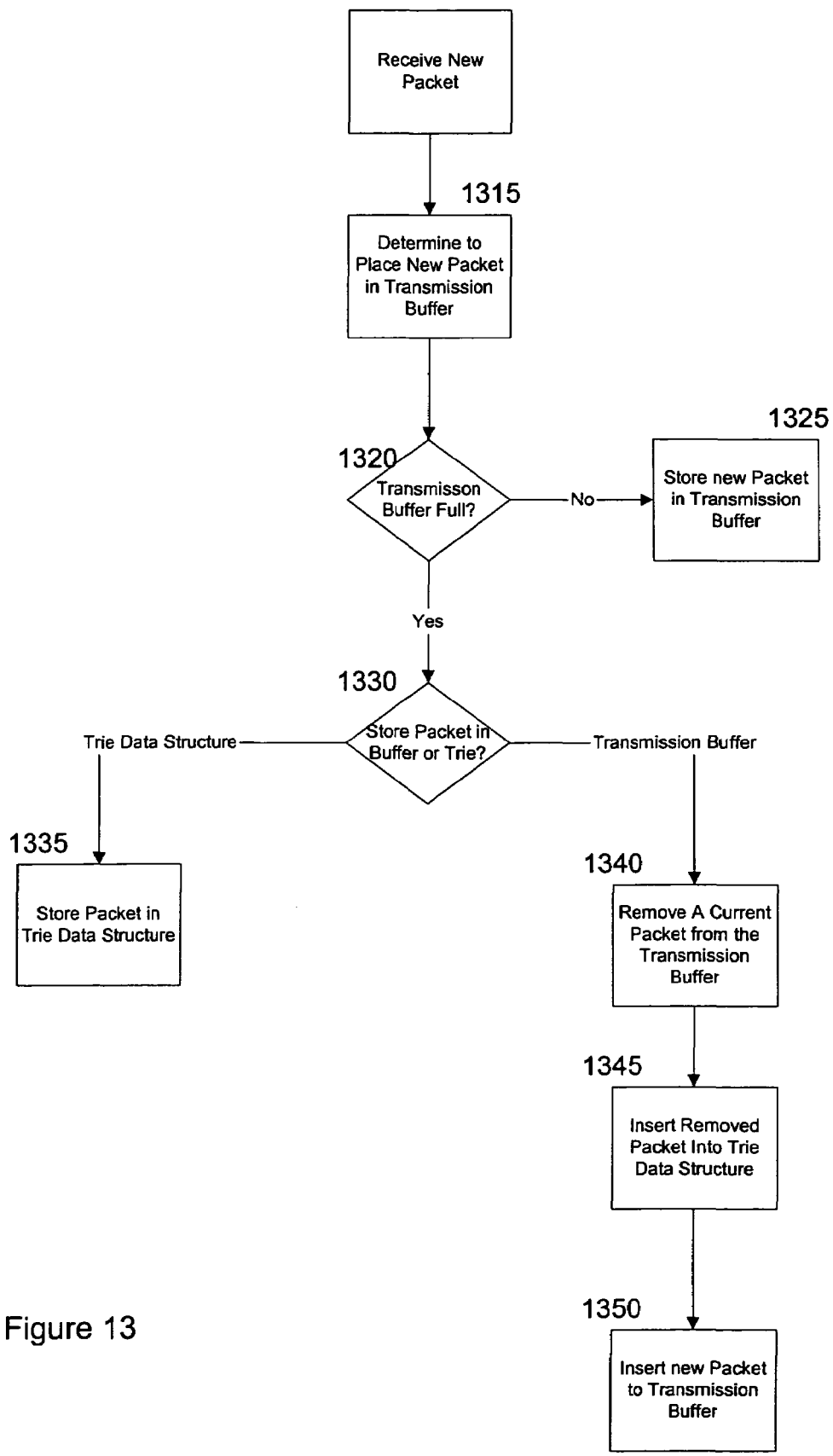
FIG. 13 illustrates one embodiment of a hide enqueuing latencies process flow for hiding the enqueuing latencies associated with inserting new packets into the trie data structure.

FIG. 13 illustrates one embodiment of a hide enqueuing latencies process flow 1300 for hiding the enqueuing latencies associated with inserting new packets into the trie data structure. This may be helpful, for example, to alleviate any problems with meeting the line rate with the Connected Trie data structure. The following process flow 1300 uses the transmission buffer 430 as a temporary repository of packets for hiding enqueuing latencies to resolve this problem as will be described.

At block 1310, the scheduler component 450 receives a new packet over the network.

At block 1315, the scheduler component 450 determines to store the new packet in a transmission buffer 430 upon receiving the packets. The transmission buffer 430 may have limited size and stores the packets in a sorted order.

At block 1320, the scheduler component 450 determines if the transmission buffer 430 is full. If the scheduler component 450 determines the transmission buffer 430 is not full, control passes to block 1325. If the scheduler component 450 determines the transmission buffer 430 is full, control passes to block 1330. At block 1325, the scheduler component 450 stores the new packet in the transmission buffer 430 in a sorted order.

At block 1330, the scheduler component 450 determines whether to store the new packet in the trie data structure 425 or the transmission buffer 430. If the scheduler component 450 determines to store the new packet in the trie data structure, control is passed to block 1335. If the scheduler component 450 determines to store the new packet in the transmission buffer 430, control passes to block 1340. At block 1335, the router server 400 stores the packet in the trie data structure. An example of inserting the packet into the trie data structure is described above in conjunction with FIGS. 9a and 9b.

At block 1340, the scheduler component 450 removes a current packet from the transmission buffer 430. At block 1345, the scheduler component 450 inserts the removed packet into the connected trie data structure. At block 1350, the scheduler component 450 inserts the new packet into the transmission buffer 430.

The benefit of using a transmission buffer comes from the fact that the transmission buffer has limited size. Since the buffer has limited size, it can be stored in a fast memory unit and accessed quickly. Transmission of the next packet always takes place from the head of the transmission buffer 430. Since the buffer is stored in a fast memory unit, it can be accessed at line rate. The transmission buffer 430 may become full at some point. Then, the next packet arriving in the router server 410 is stored in the connected trie data structure which also maintains the sorted order of packets. If the transmission buffer 430 is depleted and the trie data structure is not empty, then the next packet for transmission is fetched from the connected trie data structure. Since every leaf in the trie data structure is connected with the next two leaves in the linked list (as illustrated in FIG. 12(b)), the next two packets for transmission can be fetched in a single memory access. Therefore, the system can continue transmitting packets at line rate using the connected trie data structure even if the transmission buffer 430 is depleted.

In one embodiment, each time a dequeuing thread executes, the dequeuing thread fetches the next two packets for transmission from the connected trie data structure, provided that the connected trie data structure is not empty. During the execution of enqueuing operations, there might be a case where enqueued packets carry time stamps, which are in between the time stamp of the packet at the head of the transmission buffer 430 and the rightmost packet fetched from the trie data structure. In this case, packets are inserted into the transmission buffer 430 before their enqueuing operation completes. In this way, QoS violations are avoided and the fairness of the scheduler is maintained. In one embodiment, to completely hide the latency of one enqueuing operation, the size of the transmission buffer 430 has to be equal to the maximum number of minimum size packets that can be transmitted during one enqueuing operation.

It is understood that the complexity of the enqueuing and dequeuing operations depend on the maximum number of elements that need to be sorted. In some single level configurations, the maximum number of elements can be as high as the number of head-of-line packets in the scheduler. In some other configurations however, packets from different connections may be assigned the same time stamp value in the scheduling horizon. In one embodiment, two algorithms can be used for sorting packets in two distinctly different ways. First, in one embodiment, a parallelized version is used of the well known 'tree of comparators' scheme can be used. This algorithm exploits the fact that the number of head-of-line packets may be smaller than the scheduling horizon in some scheduling configurations. In another embodiment, a 'connected trie' data structure, described above, can be used which exploits the fact that the scheduling horizon may be smaller than the number of head-of-line packets in some scheduling configurations. A scheduler can be implemented using the optimal of the two schemes, depending on the parameters of the single level scheduling configuration.

Generic Solution

The single-bit and multi-bit connected trie data structures as described can be used for locating the region of finish number increments where a new head-of-line packet should be inserted. In one embodiment, the solution applies to the head-of-line packets that arrive during the transmission of the first packet in the router server 410 as stated earlier. To generalize the solution to any packet, it is suffice to see that during the transmission of packets with finish number increments from 0 to the D, any arriving head-of-line packet for example, may not have finish number increments larger than 2D, where D is the scheduling horizon defined by Eq. 3. This happens because every incoming head-of-line packet cannot be tagged with a time stamp value lower than the time stamp of the packet currently in service. During the transmission of the first packet in the system, packets may arrive with finish number increments ranging from 0 to D. During the transmission of any such packet i, having finish number increment $D_i$, $0 \leq D_i \leq D$, any new incoming head-of-line packet cannot have finish number increments larger than $D_i$ plus the scheduling horizon D. Hence, in one embodiment, in the worst case, the largest finish number increment arriving during the transmission of packets with increments from 0 to D is equal to 2D.

Due to the above, in one embodiment, the router server 410 may be built for placing packets into time stamp regions using two or more connected trie data structures at a time. The initialization, enqueuing and sorting procedures of this scheme are given in conjunction with FIG. 16. FIG. 16 illustrates one embodiment of an initialization pseudo-code process flow 1610, an enqueuing pseudo-code process flow 1620, and a sorting pseudo-code process flow 1630. These procedures use the CREATE 2000, INSERT 2100 and GET_NEXT 2200 procedures disclosed above in conjunction with FIGS. 20, 21, and 22 above. In another embodiment process flow 1620 may use the MULTIBIT_INSERT or MULTIBIT_INSERT_WITH_BITMAP procedures of FIGS. 24 and 14 respectively.

Optimal Height of a Connected Trie

A. Determining the Optimal Height

The complexity of the connected trie data structure scheme described above, depends on the height of the connected trie data structure h. In one embodiment, where the scheduling algorithm used is Self Clocked Fair Queuing (SCFQ) the height of the connected trie data structure depends on the minimum weight value $\phi_{min}$ and on the maximum packet size value $p_{max}$. Since scheduling fairness depends on the order of the transmission of packets and not on the exact values of their time stamps, it is possible to multiply the weight values with any positive real constant and still obtain a scheduling system that does not violate the GPS order of transmission. Since it is more convenient for computer systems to represent time stamp values as integers, it is often suggested that weights should be normalized to a set of values so that their inverse values multiplied by all possible packet sizes would result in integer finish numbers. Among all positive real constants that result in integer finish numbers, there must be a set of constants that minimize the maximum finish number increment D and hence the height of the connected trie data structure.

For example, considering a scheduler regulates traffic among N=64K competing flows where each flow sends packets of sizes ranging from $p_{min}$=64 to $p_{max}$=1500 bytes. Half of the flows are associated with weight values equal to $\phi_{min}$=10, whereas the remaining half are associated with weight values equal to $\phi_{max}$=20. One could think of normalizing the weight values to 1. In this case, each weight value needs to be multiplied with the constant factor $C''=1.1017 \cdot 10^{-6}$. The scheduling horizon D in this case is equal to 98304, which is larger than the number of head-of-line packets in the router. It is understood that normalizing weight values to 1 may not help improve the performance of the router server 410, in this case. The complexity of inserting elements into the connected trie data structure could be larger than the complexity of sorting across the head-of-line packets in the system (e.g., using the Tree of Comparators). In fact, one can prove that normalizing weights to 1 always results in scheduling horizons greater than the number of head-of-line packets.

Therefore, it is evident that the choice of the constant factor C, which multiplies the weight values of connections, is important to the size of the scheduling horizon D. As a result, the choice of constant factor C is also important to the performance of any priority queue scheme that schedules packets based on the distinct values of time stamps in the scheduling horizon. In the example presented above, one can see that if weights are multiplied with a constant factor $C^*$=0.05 then the scheduling horizon is reduced to D=3000 which is much smaller than the number of head-of-line packets in the router server 410. In this case, the performance of a scheme, such as the connected trie data structure discussed above, would be better than the performance of the Tree of Comparators 100.

The example presented above indicates that there exist scheduling configurations where a scheme that sorts packets across distinct time stamp values, may be preferable over a scheme that sorts across head-of-line packets. Therefore, it is good to know how to optimize the size of the scheduling horizon for a particular configuration and whether the optimized scheduling horizon results in performance improvement over the alternative approach of sorting across head-of-line packets.

Figure 17:
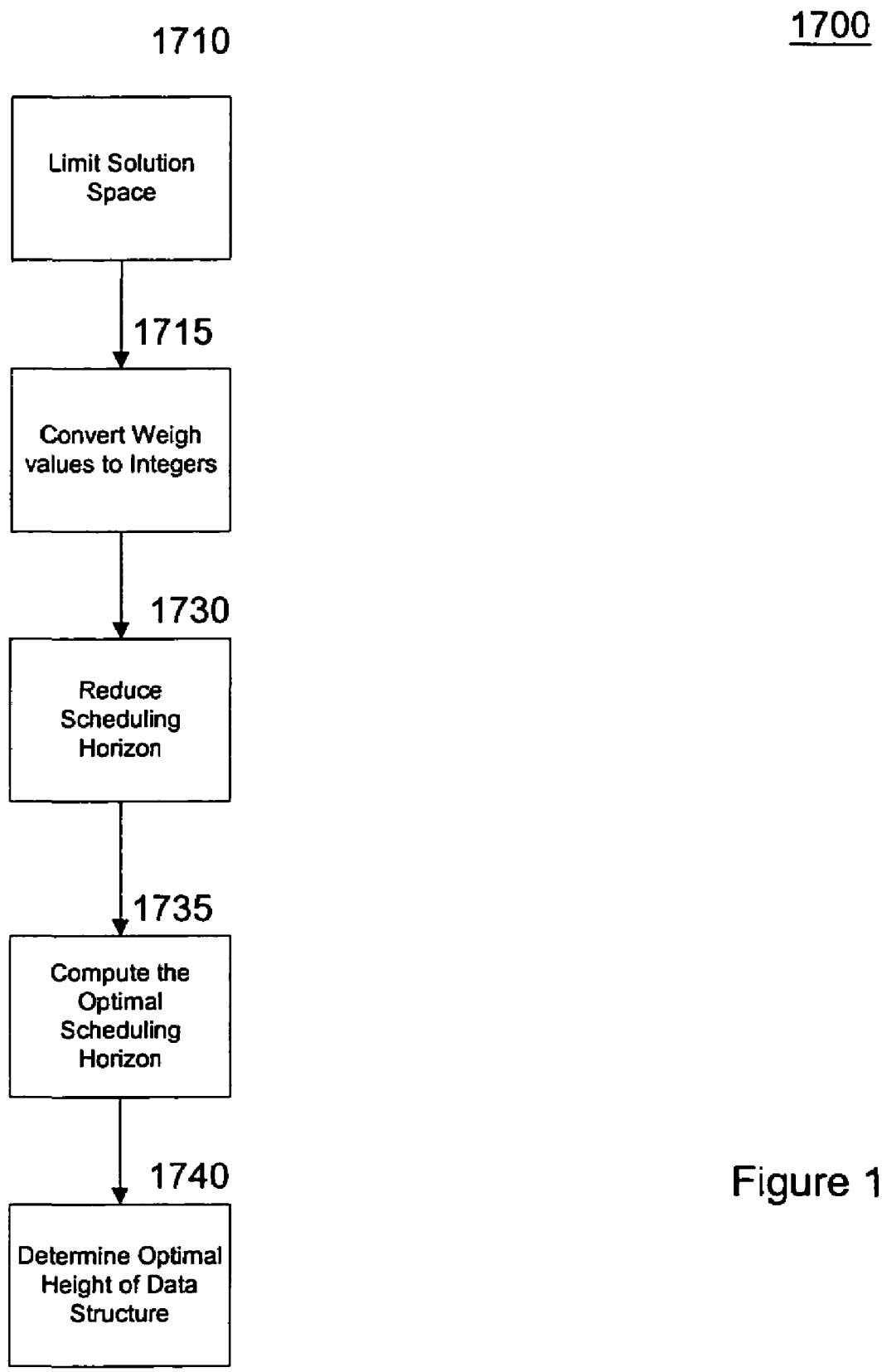
FIG. 17 illustrates one embodiment of a trie height process flow for determining the constant factor that minimizes the size of the scheduling horizon for a given scheduler configuration.

FIG. 17 illustrates one embodiment of a trie height process flow 1700 for determining the constant factor that minimizes the size of the scheduling horizon for a given scheduler configuration. It is understood that this method applies in the case when the scheduling algorithm used is Self Clocked Fair Queuing (SCFQ).

At block 1710, the scheduler component 450 limits the solution space to constant factors resulting in integer time stamp values. For example, an assumption is made that the sizes of the packets of each connection $c^i$ can take $s^i$ distinct values from the set:

$$P^i = \{p_{ij}; 1 \leq j \leq s^i\} \quad [8]$$

Also, an assumption is made that the weight values of connections are expressed in the integer form. This is a fair assumption since weight values are rarely expressed as irrational numbers.

At block 1715, the scheduler component 450 converts the weights to integers. For example, in case the weights are rational numbers (i.e., fractions), they can be converted to integers by multiplying them with the Least Common Multiple (LCM) of their denominators. Therefore, the finish number increments of packets can take any rational value from among the set:

$$\Delta = \left\{ \frac{p_{ij}}{\varphi_i}; 1 \leq i \leq N; 1 \leq j \leq s^i \right\} \quad [9]$$

To convert finish number increments to the integer form, scheduler component 450 may multiply each distinct value from the set $\Delta$ with the LCM of their denominators. Defining:

$$L = LCM\{\varphi_i; 1 \leq i \leq N\} \text{ and:} \quad [10]$$

$$L_{ij} = L \cdot \frac{p_{ij}}{\varphi_i} \quad [11]$$

The horizon of the finish number increments $L_{ij}$ defined by Eq. 11 is smaller than any other horizon that would result from converting the rational values of set $\Delta$ into integers. This is true because the elements of $\Delta$ are multiplied with the LCM of their denominators. Furthermore, the size of the scheduling horizon of the router server 410 may still be improved as discussed. For example, Packet sizes may take values such that their Greatest Common Divisor (GCD) is larger than one.

Therefore, at block 1730, the scheduler component 450 reduces the scheduling horizon. For example, the scheduler component 450 may divide the values of the finish number increments defined by Eq. 11 with their GCD to reduce the scheduling horizon. Defining:

$$G = GCD\{L_{ij}; 1 \leq i \leq N, 1 \leq j \leq s^i\} \text{ and:} \quad [12]$$

$$G_{ij} = \frac{L_{ij}}{G} \quad [13]$$

In one embodiment, the scheduling horizon of finish number increments $G_{ij}$ defined by Eq. 13 is the smallest possible horizon that includes integer finish increments only. This is true because division of $L_{ij}$ with any number greater than their greatest common divisor would result in non-integer finish number increments.

At block 1735, the scheduler component 450 computes the optimal scheduling horizon. Thus, the optimal scheduling horizon $D^*$ is equal to:

$$D^* = \frac{L \cdot p_{max}}{G \cdot \varphi_{min}} \quad [14]$$

where L and G are defined by Eq. 10 and 12 respectively.

At block 1740, the scheduler component 450 determines the optimal height of the trie data structure. For example, the optimal height h* of the connected trie data structure is given by Eq. 15 below:

$$h^* = \left\lceil \log_2 \frac{D^*}{W} \right\rceil = \left\lceil \log_2 \frac{L \cdot p_{max}}{W \cdot G \cdot \varphi_{min}} \right\rceil \quad [15]$$

In one embodiment, the computation of the optimal scheduling horizon requires the calculation of a Least Common Multiple (LCM) and a Greatest Common Divisor (GCD). To find the LCM of two numbers, it is suffice to divide their product with their GCD. Therefore, the calculation of an LCM can be deduced to the calculation of a GCD. The GCD of a pair of numbers can be calculated using the Euclidian algorithm. The Euclidian algorithm requires a logarithmic number of steps as a function of the maximum value processed. Therefore, the complexity of finding the optimal height of the connected trie data structure is polynomial as a function of the number of distinct connection weights and packet sizes and logarithmic as a function of the range of weight values. Such calculation can be performed off-line before the beginning of the operation of the scheduler.

The main source of QoS violations in a hierarchical scheduler comes from the need to represent time stamp values with a finite number of bits. In various scheduler implementations, the number of bits used for representing time stamp values is typically limited (e.g., 32). The optimal scheduling horizon D*, which minimizes the height of a connected trie data structure is given in Eq. 14. The number of bits h* required for accurately representing the optimal scheduling horizon is given from Eq. 15. Height h* may be lower or greater than the number of bits used for representing finish number increments. If h* is lower, then no QoS violations may be introduced to the hierarchical scheduler component 450. If h* is greater, then the scheduling horizon may be truncated. Truncation of the scheduling horizon results in QoS violations. These QoS violations can be estimated given the packet sizes of connections and associated weight values.

Figure 18:
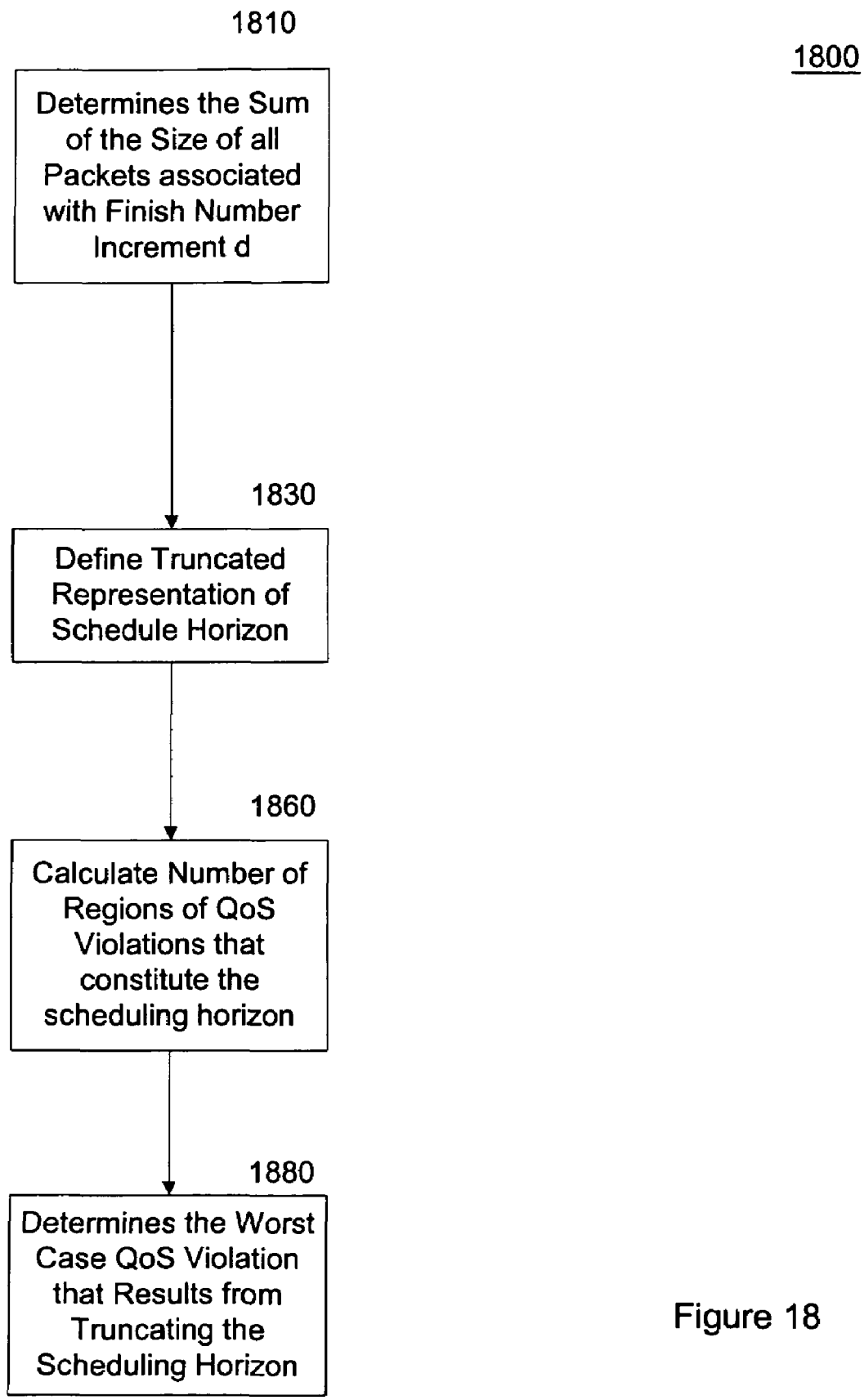
FIG. 18 illustrates one embodiment of a QoS violations process flow for determining the QoS violations that result from truncating the scheduling horizon.

FIG. 18 illustrates one embodiment of a QoS violations process flow 1800 for determining the QoS violations that result from truncating the scheduling horizon.

At block 1810, the scheduler component 450 determines the sum of the size of all packets associated with finish number increment d. For example, the assumption is made that the sizes of packets of each connection $c^i$ can take $s^i$ distinct values from the set:

$$P^i = \{p_{ij}; 1 \leq j \leq s^i\} \quad [16]$$

Let's consider the set T(d), $0 \leq d \leq D$ defined as:

$$T(d) = \left\{ (i, j); \frac{L \cdot p_{ij}}{G \cdot \varphi_i} = d, 1 \leq i \leq N, 1 \leq j \leq s^i \right\} \quad [17]$$

where $\phi_i$ is the weight associated with connection $c^i$ and L and G are defined from Eq. 10 and Eq. 12 respectively. The set T(d) is defined for a finish number increment d. T(d) includes all pairs of indexes (i, j) associated with flow weights $\phi_i$ and packet sizes $p_{ij}$ resulting in finish number increments equal to d. Let's also consider the function S(d) defined in the integer space [0, D] as:

$$S(d) = \sum_{(i,j) \in T(d)} p_{ij} \qquad [18]$$

The function S(d) returns the sum of the sizes of all packets associated with finish number increment d. Knowledge of function S(d) is useful in the calculation of worst case QoS violations because S(d) reflects the worst case transmission time of all packets that have time stamp values collocated at the same position d in the scheduling horizon. The calculation of S(d) can be done in polynomial time as a function of the number of flows N and distinct packet sizes before the beginning of the operation of the scheduler. Let's assume that the number of bits used for representing finish number increments is $h^t$ such that:

$$2^{h^t} < D^* \qquad [19]$$

At block 1830, the scheduling component 450 defines a truncated representation of the scheduling horizon. For example, using fewer bits to represent the scheduling horizon D* than what is needed for accuracy, results in a truncated representation of the scheduling horizon $D^t$ equal to:

$$D^t = 2^{h^t} \qquad [20]$$

Because of the truncation of the scheduling horizon some packets annotated with different time stamp values may be assigned the same finish number increments. One can see that the scheduling horizon can be divided into regions of fixed width $W^t$ such that QoS violations may occur inside each region but not across regions. This means that the GPS order of transmission may be violated between the packets of the same region of width $W^t$ but not across regions. $W^t$ is given by Eq. 21 below:

$$W^t = \frac{2^{\lceil \log_2 D^* \rceil}}{D^t} \qquad [21]$$

At block 1860, the scheduling component 450 calculates the number of regions of QoS violations that constitute the scheduling horizon. For example, the number of regions of QoS violations that constitute the scheduling horizon is $D^t$. The symbol R(k) is used to refer to the $k^{th}$ region of QoS violations. This is the region which includes all finish number increments from $(k-1) \cdot W^t$ up to $k \cdot W^t$.

At block 1880, the scheduling component 450 determines the worst case QoS violation that results from truncating the scheduling horizon. For example, the worst case QoS violation happens when the packets which have finish number increments at the beginning of a region are transmitted after all other packets in the region. Therefore, the worst case QoS violation which may occur inside region R(k) is:

$$V(k) = \sum_{d=(k-1) \cdot W^t + 1}^{k \cdot W^t} S(d)/C \qquad [22]$$

where C is the capacity of the output link. Hence the worst case violation which may occur in the system is:

$$V = \max_{1 \le k \le D^t} V(k) \qquad [23]$$

It is understood that the worst case QoS violation V can be computed off-line from the values of connection weights and packet sizes.

It will be appreciated that more or fewer processes may be incorporated into the method(s) illustrated in FIGS. 6, 7, 8, 11, 13, 14, 15, 16, 17, and 18 without departing from the scope of the invention and that no particular order is implied by the arrangement of blocks shown and described herein. It further will be appreciated that the method(s) described in conjunction with FIGS. 6, 7, 8, 11, 13, 14, 15, 16, 17, and 18 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-accessible medium having stored thereon instructions which may be used to program a computer (or other electronic devices) to perform the methods. For the purposes of this specification, the terms "machine-accessible medium" shall be taken to include any medium that is capable of storing or encoding a sequence of instructions for execution by the machine and that cause the machine to perform any one of the methodologies of the present invention. The term "machine-accessible medium" shall accordingly be taken to include, but not be limited $t_0$, solid-state memories, optical and magnetic disks, and carrier wave signals. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

Figure 19:
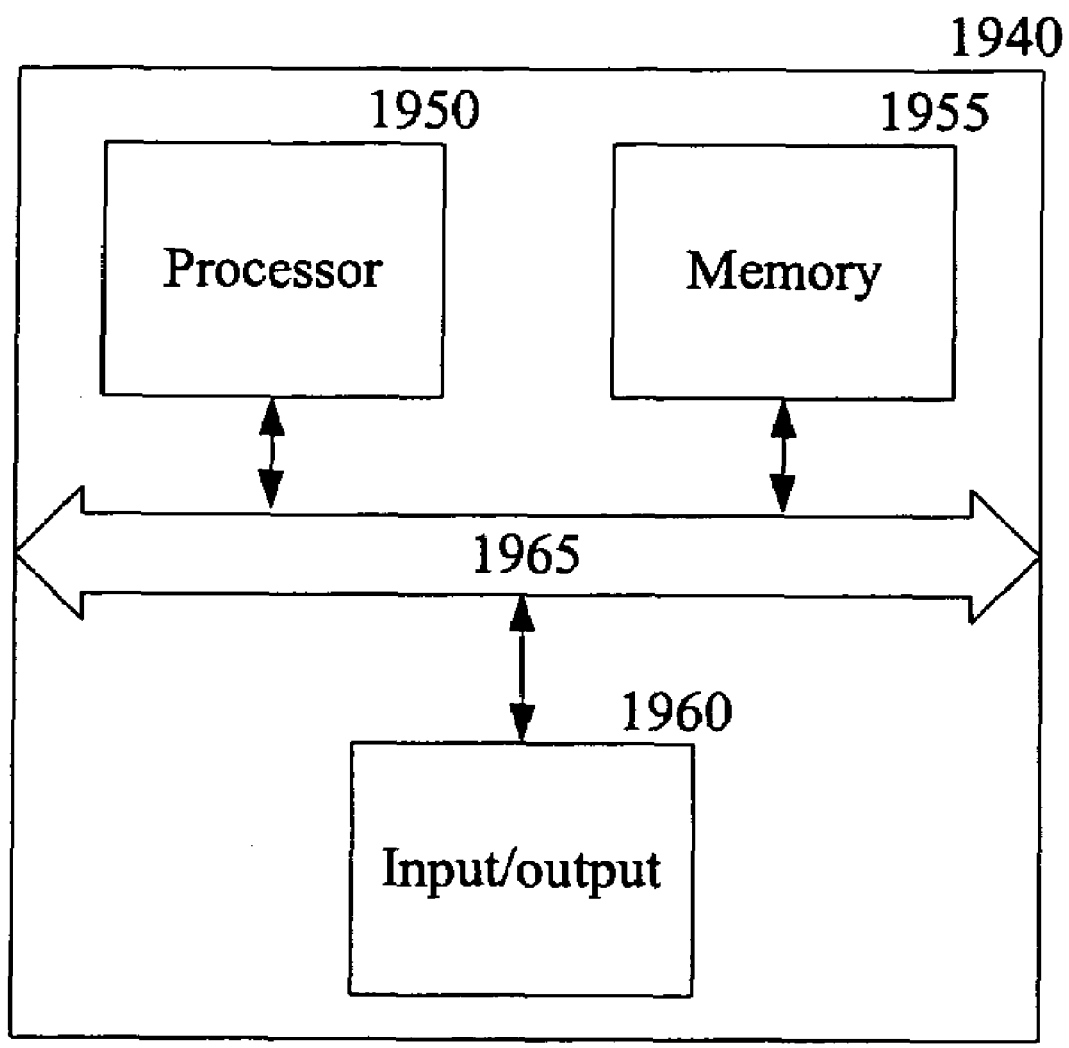
FIG. 19 illustrates an exemplary computer system according to one embodiment of the invention.

FIG. 19 illustrates one embodiment of a computer system suitable for performing the scheduler component. The computer system 1940 includes a processor 1950, a memory 1955, and an input/output capability 1960, all coupled to a system bus 1965.

The processor 1950 represents a central processing unit of any type of architecture, such as a CISC, RISC, VLIW, or hybrid architecture. In addition, the processor 1950 could be implemented on one or more chips. The processor 1950 may also comprise multiple processing units executing code in parallel and each unit may support the execution of one or multiple hardware or software threads. The memory 1955 is configured to store instructions which, when executed by the processor 1950, perform the methods described herein. The memory 1955 may also store the scheduler component 450, the trie data structure 425, packet queues, data structures used for calculating the height of the connected trie and QoS violations and/or the transmission buffer 430. Memory 1955 may be implemented as read only memory ("ROM"); dynamic or static random access memory ("RAM"), cache memory and can be in the same chip as the processor 1950 or in one or multiple separate chips.

Input/output 1960 may include components to facilitate user interaction with the computer system 1940 such as a keyboard, a mouse, a display monitor, a microphone, a speaker, a display, a network card (e.g., Ethernet, Inferred, cable modem, Fax/Modem, etc.), etc. Input/output 1960 also encompasses various types of machine-readable media, including any type of storage device that is accessible by the processor 1950. For example, a machine-readable medium may include read only memory ("ROM"); dynamic or static random access memory ("RAM"), cache memory, magnetic disk storage media; optical storage media; flash memory devices; electrical, optical, acoustical, or other forms of propagated signals (e.g., carrier waves, infrared signals, digital signals, etc.); etc. Thus, a machine-readable medium includes any mechanism that provides (i.e., stores and/or transmits) information in a form readable by a machine (e.g., a computer). One of skill in the art will immediately recognize that the term "machine-readable medium/media" further encompasses a carrier wave that encodes a data signal.

It will also be appreciated that system software executing the scheduler component stored in memory 1955 may control the computer system 1940. It may be complete operating system software of may encompass only the functionality needed for executing the scheduler component. The operating system may be, for example, VX Works-based, PC-based, Mac-based, Linux-based, Unix-based, etc. Input/output and related media 1960 may store the machine-executable instructions for the operating system and methods of the present invention.

In addition, the bus 1965 may represent one or more busses (e.g., PCI, ISA, X-Bus, EISA, VESA, etc.) and bridges (also termed as "bus controllers"). While this embodiment is described in relation to a single processor computer system, the invention could be implemented in a multi-processor computer system.

The description of FIG. 19 is intended to provide an overview of computer hardware and other operating components suitable for implementing the invention, but is not intended to limit the applicable environments. It will be appreciated that the computer system 1940 is one example of many possible computer systems that have different architectures. A typical computer system will usually include at least a processor, a memory, and a bus coupling the memory to the processor. One of skill in the art will immediately appreciate that the invention can be practiced with other computer system configurations, including multiprocessor systems, minicomputers, mainframe computers, edge routers and the like. The invention can also be practiced in distributed computing environments where tasks are performed by remote processing devices that are linked through a communications network.

Thus, a method and system for sorting packets with Packet Scheduler using a connected trie data structure, has been described. Specifically, a data structure design has been disclosed that balances the performance benefits that come from quickly traversing the branches of a trie data structure against the cost of introducing additional amounts of state in the nodes. Furthermore, it is understood that by adding, for example, two additional pointers and two numerical values in each node of the trie data structure, the leaf nodes may be connected together using doubly connected linked lists. Also, a design of a connected trie data structure that supports logarithmic insertion of elements has been described, while reducing the constant factor involved in finding the minimum to a single memory access. It is also understood that the search for the minimum element is done in O(1) time by connecting the leaf nodes of the trie data structure using double connected linked lists.

While the invention has been described in terms of several embodiments, those skilled in the art will recognize that the invention is not limited to the embodiments described. The method and apparatus of the invention can be practiced with modification and alteration within the scope of the appended claims. The description is thus to be regarded as illustrative instead of limiting on the invention.

What is claimed is:

1. A computer-implemented method comprising:
receiving a packet over a network;
assigning the packet a time stamp value;
inserting the packet into a trie data structure, wherein the trie data structure represents a scheduling horizon and the trie data structure includes a plurality of packets; and
transmitting the packet from the trie data structure over the network,
wherein each packet in the trie data structure is associated with a leaf node,
wherein each leaf node of the trie data structure represents a region of time stamps storing the plurality of packets with finish number increments in a specific region associated with each leaf node.

2. The method of claim 1, wherein the scheduling horizon is defined for a self clocked fair queuing scheduling component of a network node system.

3. The method of claim 1, where the leaf nodes of the trie data structure are connected into a linked list.

4. The method of claim 1, wherein one or more of the leaf nodes are linked to a previous two leaf nodes in the linked list.

5. The method of claim 1, wherein at least a subset of the trie data structure is dynamically allocated.

6. The method of claim 1, wherein at least a subset of the trie data structure is dynamically deallocated.

7. The method of claim 1, wherein the trie data structure is a connected trie data structure.

8. The method of claim 1, wherein the trie data structure is a multibit connected trie data structure.

9. The method of claim 1, wherein the trie data structure is a multibit connected trie data structure that uses bitmap compression.

10. The method of claim 1, wherein one ore more of the leaf nodes are linked to a previous two leaf nodes in the linked list.

11. The method of claim 1, wherein one or more of the leaf nodes are linked to a subsequent two leaf nodes in a linked list.

12. The method of claim 1, further comprising fetching two leaf nodes from the linked list to be processed for transmission across the network using a single memory access.

13. The method of claim 1, further comprising hiding enqueuing latencies using a transmission buffer.

14. The method of claim 1, further comprising optimizing a height of the trie data structure based on a value of each connection weight and a size of each packet of the plurality of packets.

15. A system comprising:
a trie data structure, the trie data structure representing a scheduling horizon; and
a packet scheduler component, the packet scheduler component to insert a set of packets in the trie data structure, and the packet scheduler component to insert each packet into the trie data structure,
wherein each packet in the trie data structure is associated with a leaf node,
wherein the leaf nodes of the trie data structure represents a region of time stamps storing the set of packets with finish number increments in a specific region associated with each leaf node.

16. The system of claim 15, wherein the scheduling horizon is defined for a self clocked fair queuing scheduling component of a network system.

17. The system of claim 15, wherein the system is a network node system.

18. The system of claim 15, wherein the leaf nodes of the trie data structure are connected into a linked list.

19. The system of claim 15, wherein the leaf nodes of the trie data structure are connected into a doubly linked list.

20. The system of claim 15, wherein at least a subset of the trie data structure is dynamically allocated.

21. The system of claim 15, wherein least a subset of the trie data structure is dynamically deallocated.

22. The system of claim 15, wherein the trie data structure is a connected trie data structure.

23. The system of claim 15, wherein the trie data structure is a multibit connected trie data structure.

24. The system of claim 15, wherein the trie data structure is a multibit connected trie data structure that uses bitmap compression.

25. The system of claim 15, wherein one or more of the leaf nodes are linked to a previous two leaf nodes in the linked list.

26. The system of claim 15, wherein one or more of the leaf nodes are linked to a subsequent two leaf nodes in a linked list.

27. The system of claim 15, wherein the packet scheduler component further to fetch two leaf nodes from the linked list to be processed for transmission across the network using a single memory access.

28. The system of claim 15, wherein the packet scheduler component further to hide an enqueuing latency using a transmission buffer.

29. The system of claim 15, wherein the packet scheduler component further to optimize a height of the trie data structure based on a value of each connection weight and a size of each packet of the set of packets.

30. A machine-accessible medium that provides instructions that, if executed by a machine, will cause said machine to perform operations comprising:
   receiving a packet over a network;
   assigning the packet a time stamp value;
   inserting the packet into a trie data structure, wherein the trie data structure represents a scheduling horizon and the trie data structure includes a plurality of packets; and
   transmitting the packet from the trie data structure over the network,
   wherein each packet in the trie data structure is associated with a leaf node,
   wherein each leaf node of the trie data structure represents a region of time stamps storing the plurality of packets with finish number increments in a specific region associated with each leaf node.

31. The machine-accessible medium of claim 30, wherein the scheduling horizon is defined for a self clocked fair queuing scheduling component of a network node system.

32. The machine-accessible medium of claim 30, where the leaf nodes of the trie data structure are connected into a linked list.

33. The machine-accessible medium of claim 32, where the leaf nodes of the trie data structure are connected into a doubly linked list.

34. The machine-accessible medium of claim 30, wherein at least a subset of the trie data structure is dynamically allocated.

35. The machine-accessible medium of claim 30, wherein at least a subset of the trie data structure is dynamically deallocated.

36. The machine-accessible medium of claim 30, wherein the trie data structure is a connected trie data structure.

37. The machine-accessible medium of claim 30, wherein the trie data structure is a multibit connected trie data structure.

38. The machine-accessible medium of claim 30, wherein the trie data structure is a multibit connected trie data structure that uses bitmap compression.

39. The machine-accessible medium of claim 32, wherein one or more of the leaf nodes are linked to a previous two leaf nodes in the linked list.

40. The machine-accessible medium of claim 32, wherein one or more of the leaf nodes are linked to a subsequent two leaf nodes in a linked list.

41. The machine-accessible medium of claim 32, further comprising fetching two leaf nodes from the linked list to be processed for transmission across the network using a single memory access.

42. The machine-accessible medium of claim 30, further comprising hiding enqueuing latencies using a transmission buffer.

43. The machine-accessible medium of claim 30, further comprising optimizing a height of the trie data structure based on a value of each connection weight and a size of each packet of the plurality of packets.

* * * * *

UNITED STATES PATENT AND TRADEMARK OFFICE
CERTIFICATE OF CORRECTION

PATENT NO. : 7,457,296 B2
APPLICATION NO. : 10/956326
DATED : November 25, 2008
INVENTOR(S) : Kounavis et al.

It is certified that error appears in the above-identified patent and that said Letters Patent is hereby corrected as shown below:

In column 24, at line 64, delete "wherein the leaf nodes" and insert --where each leaf node--.

Signed and Sealed this

Fifteenth Day of December, 2009

David J. Kappos
*Director of the United States Patent and Trademark Office*